Figure 1:
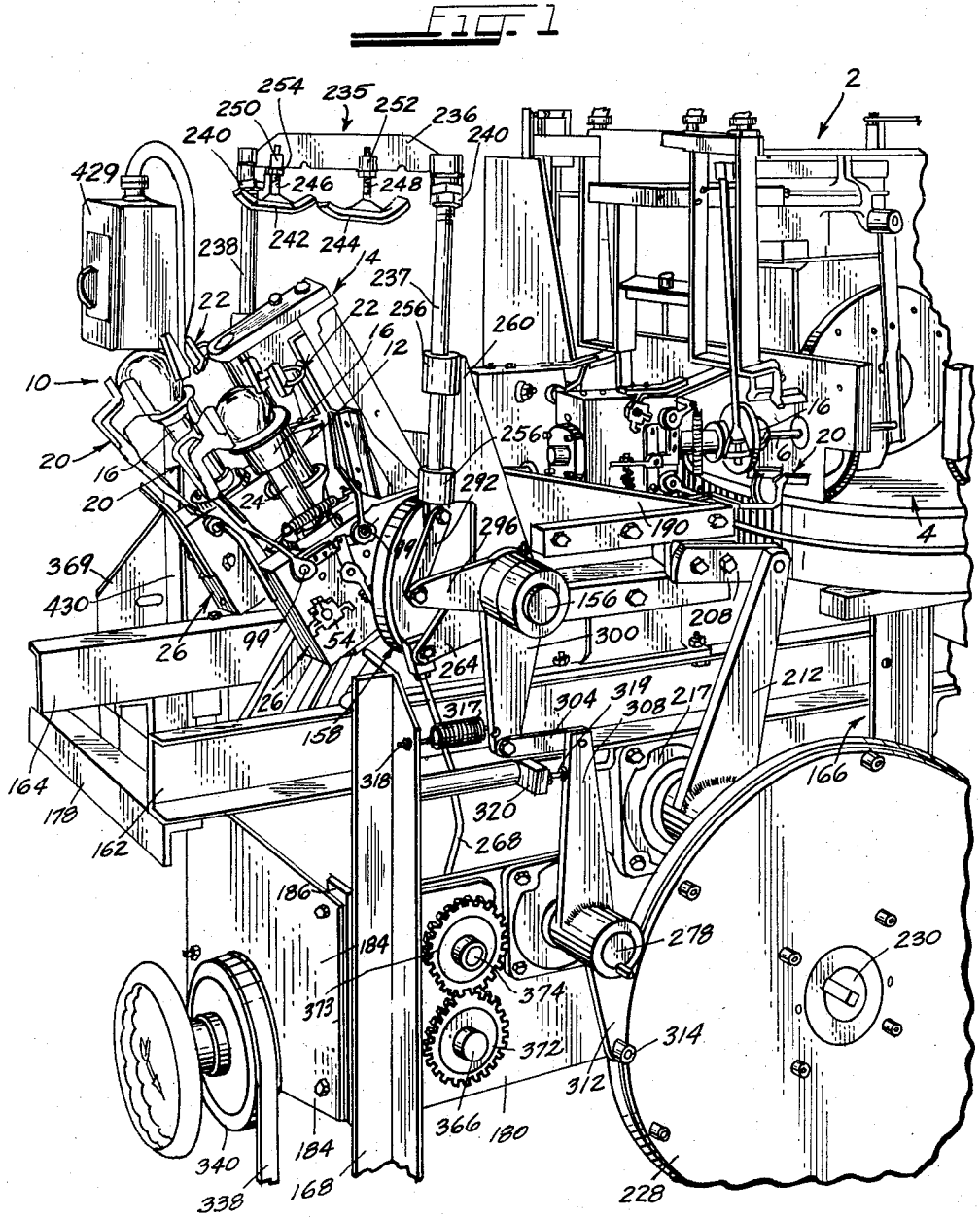

Sept. 20, 1960 M. K. BUCHNER ET AL 2,953,236
PEAR FEEDER
Filed May 2, 1958 18 Sheets-Sheet 1

INVENTORS:
MARVIN K. BUCHNER
CLARENCE R. THOMPSON
BY
Smith, Prangley, Baird and Clayton
Attys.

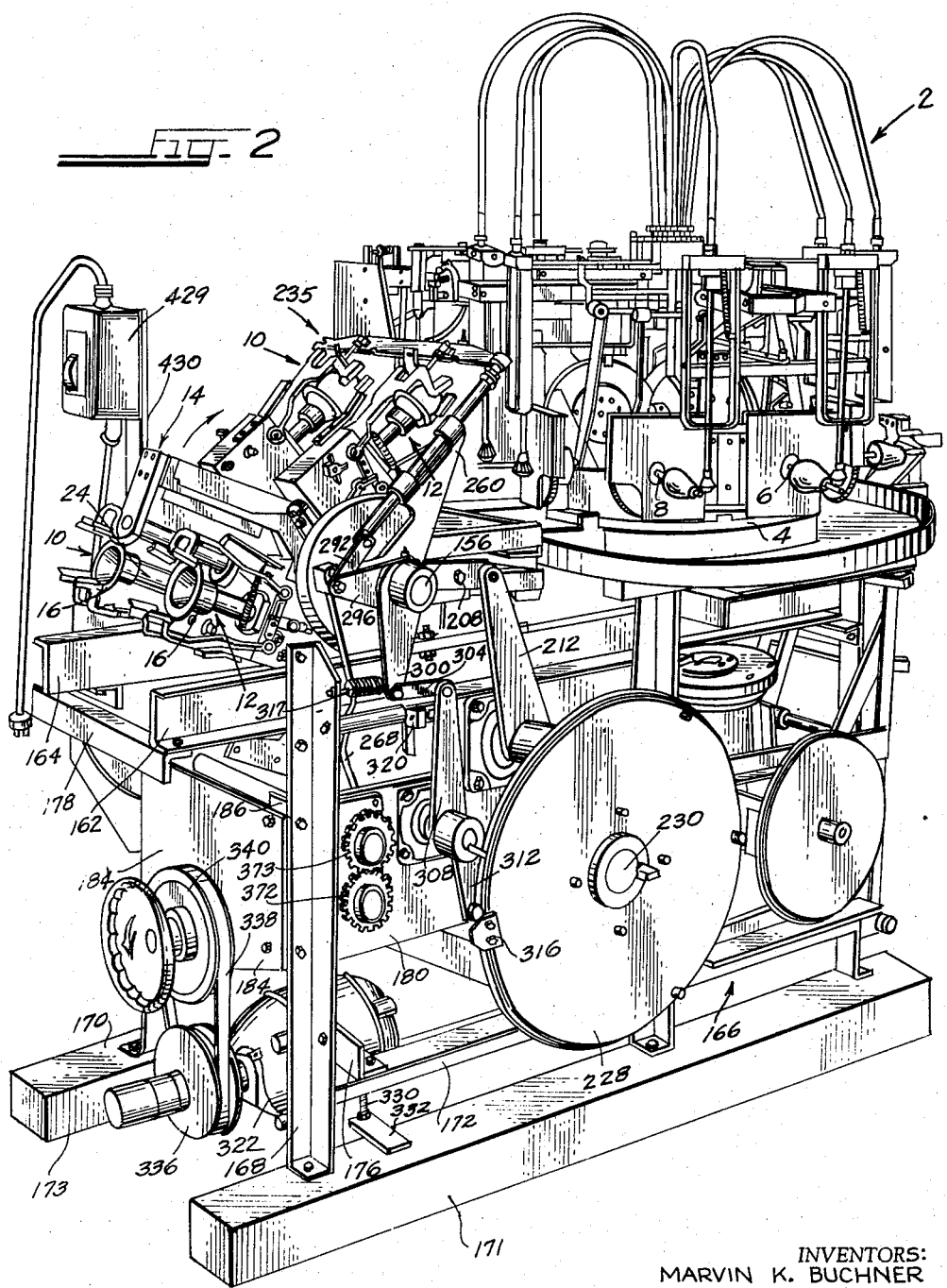

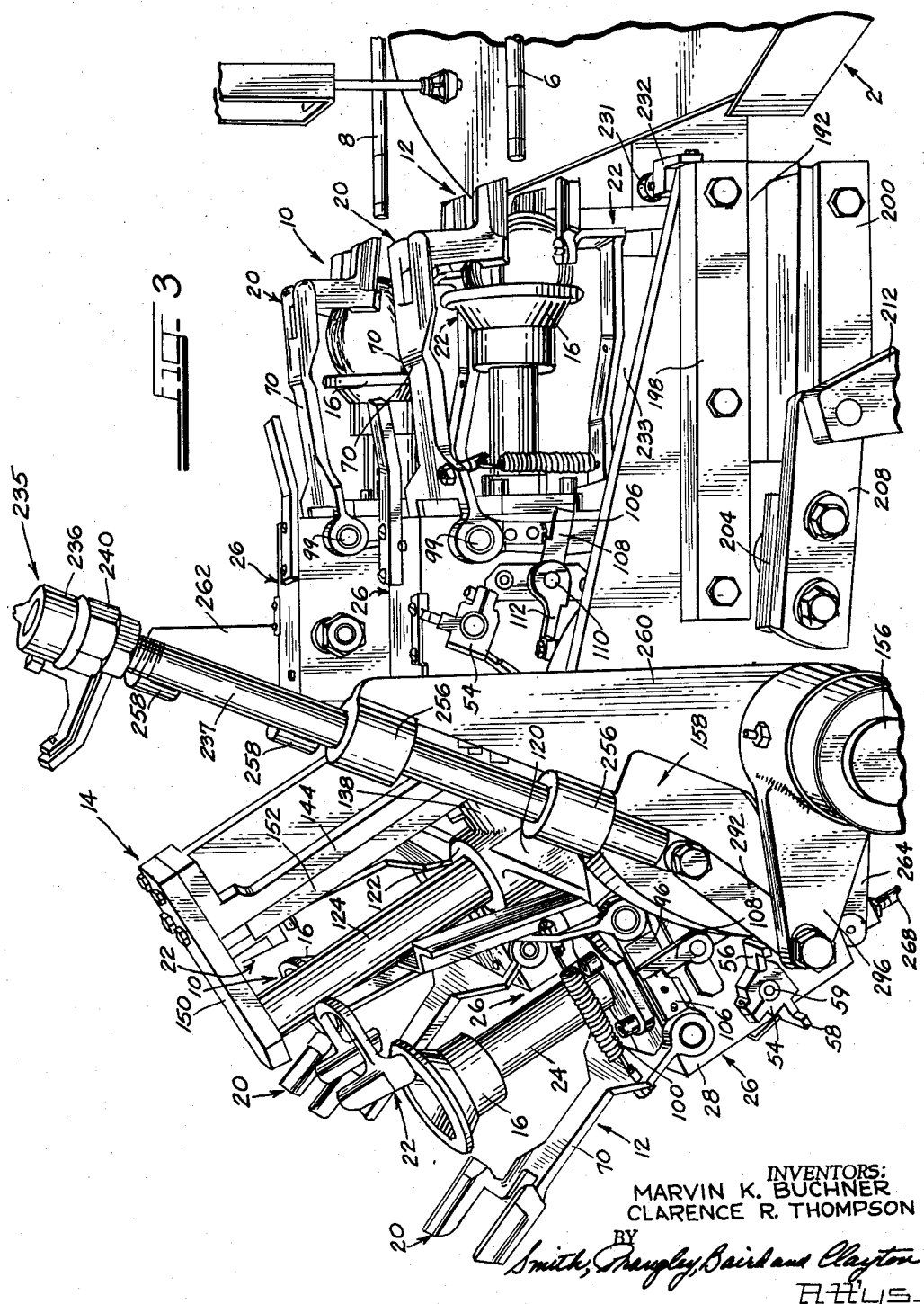

Sept. 20, 1960    M. K. BUCHNER ET AL    2,953,236
PEAR FEEDER
Filed May 2, 1958    18 Sheets-Sheet 4
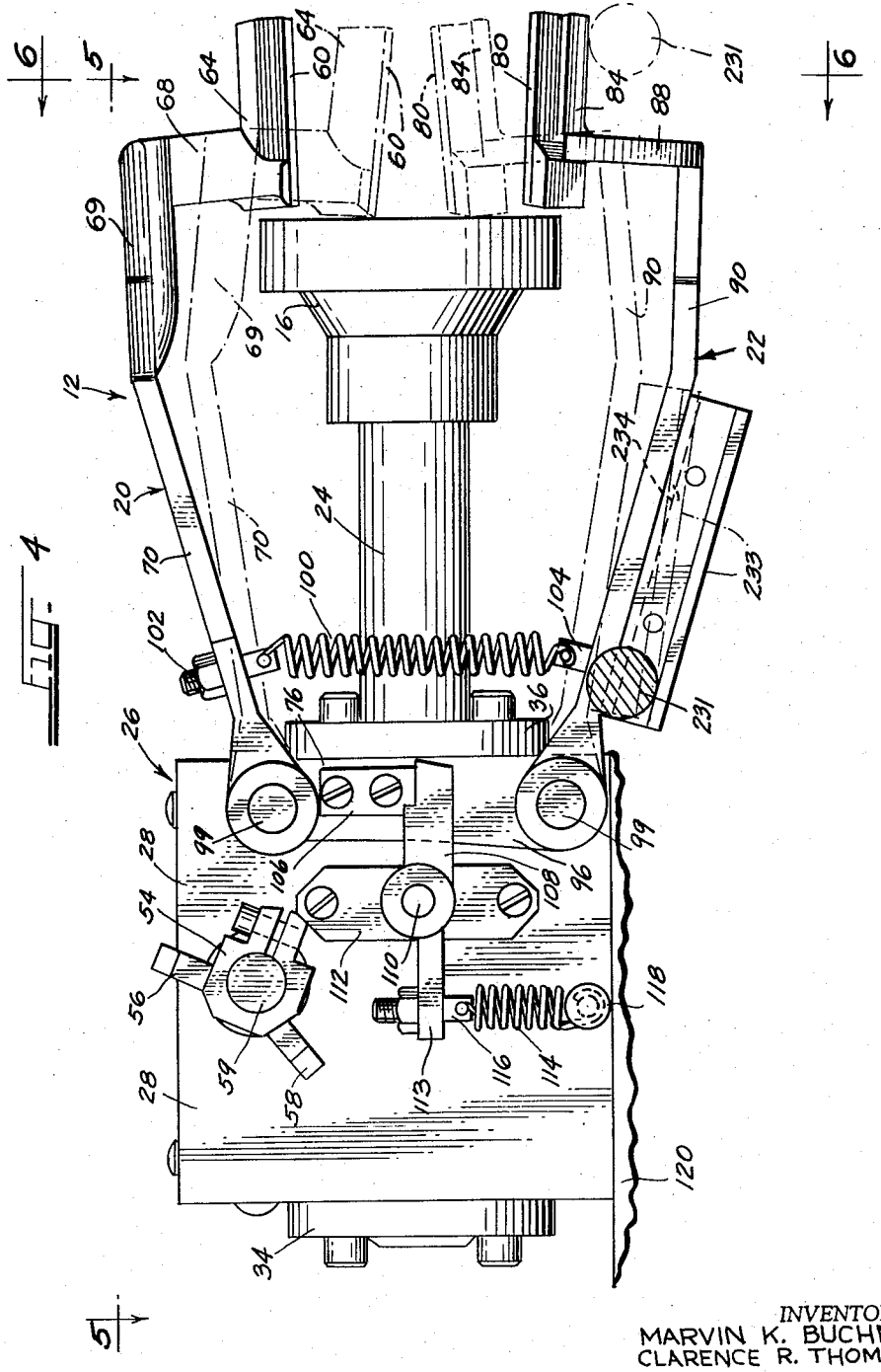
INVENTORS:
MARVIN K. BUCHNER
CLARENCE R. THOMPSON
BY

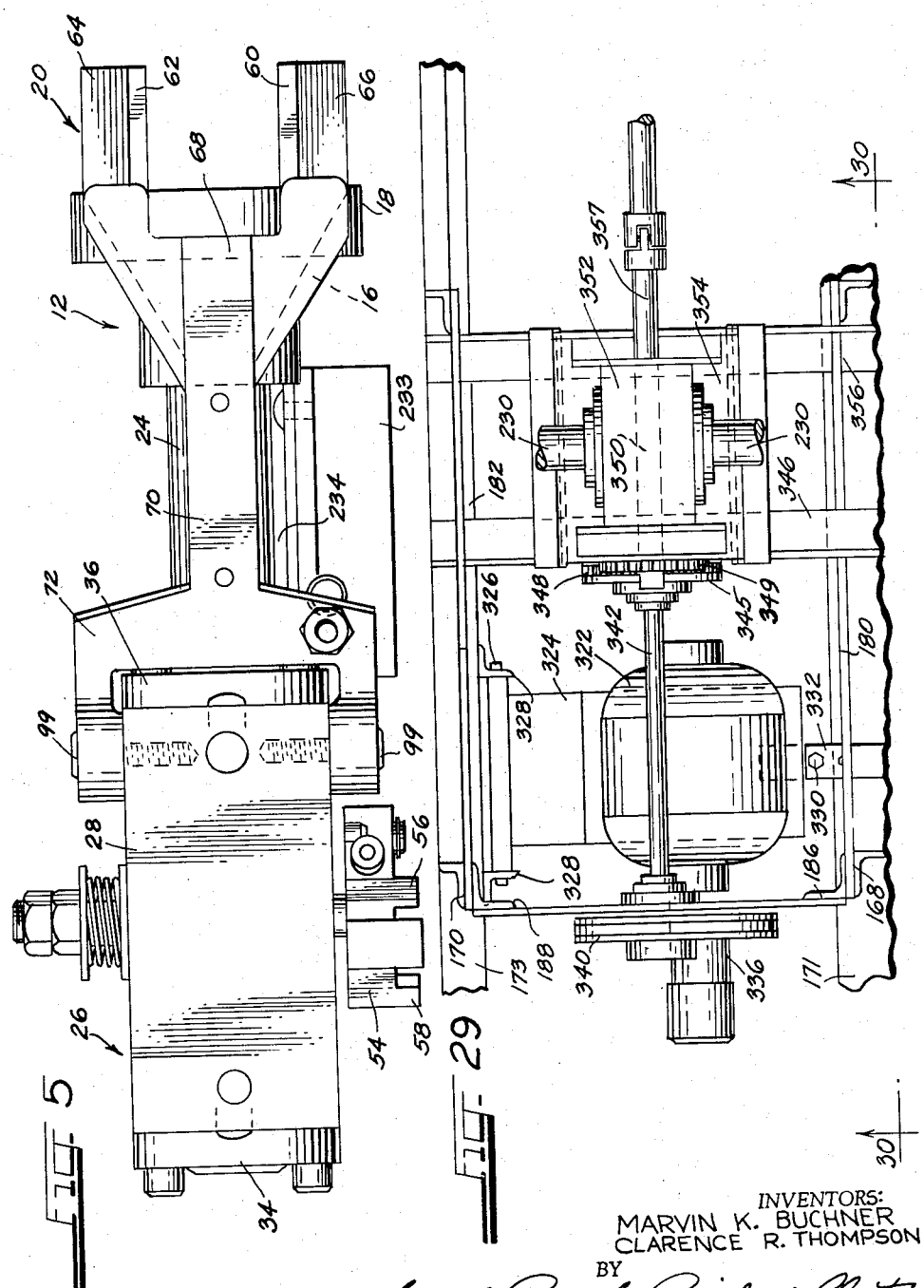

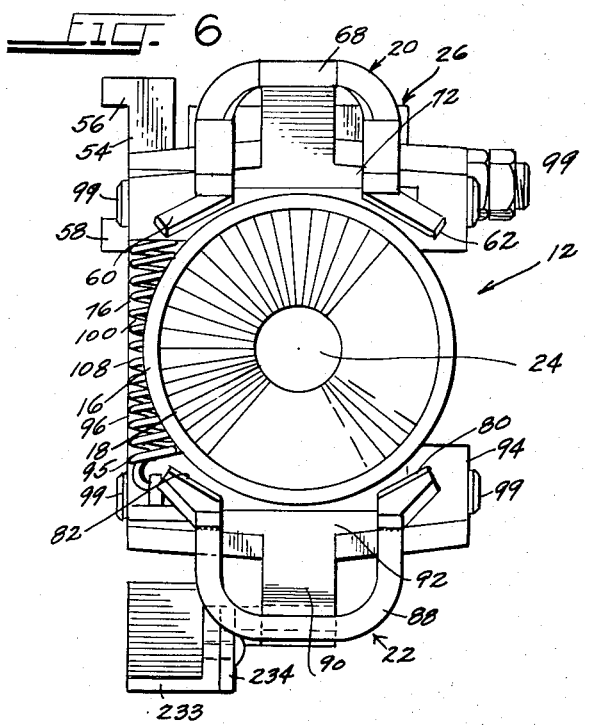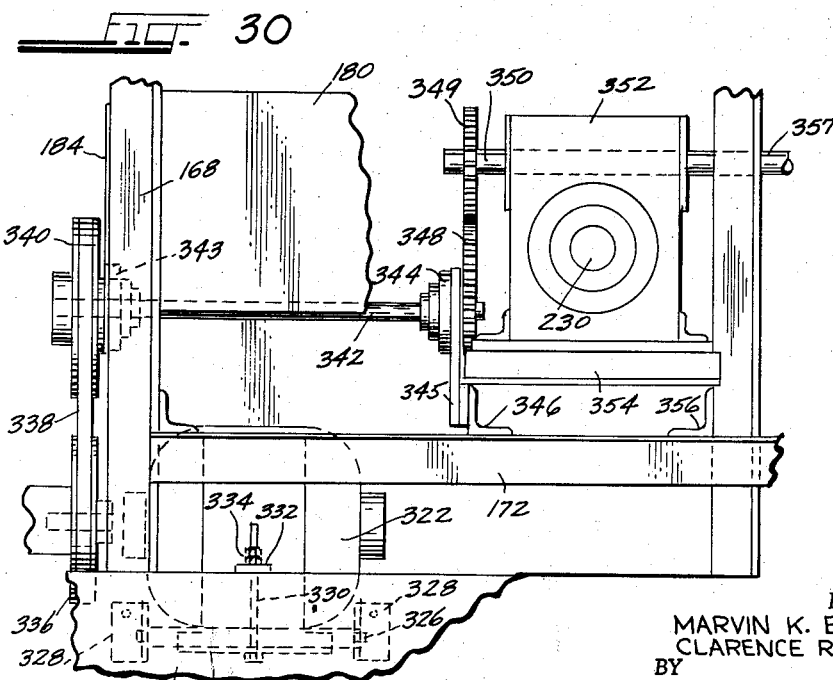

Sept. 20, 1960 M. K. BUCHNER ET AL 2,953,236
PEAR FEEDER
Filed May 2, 1958 18 Sheets-Sheet 7
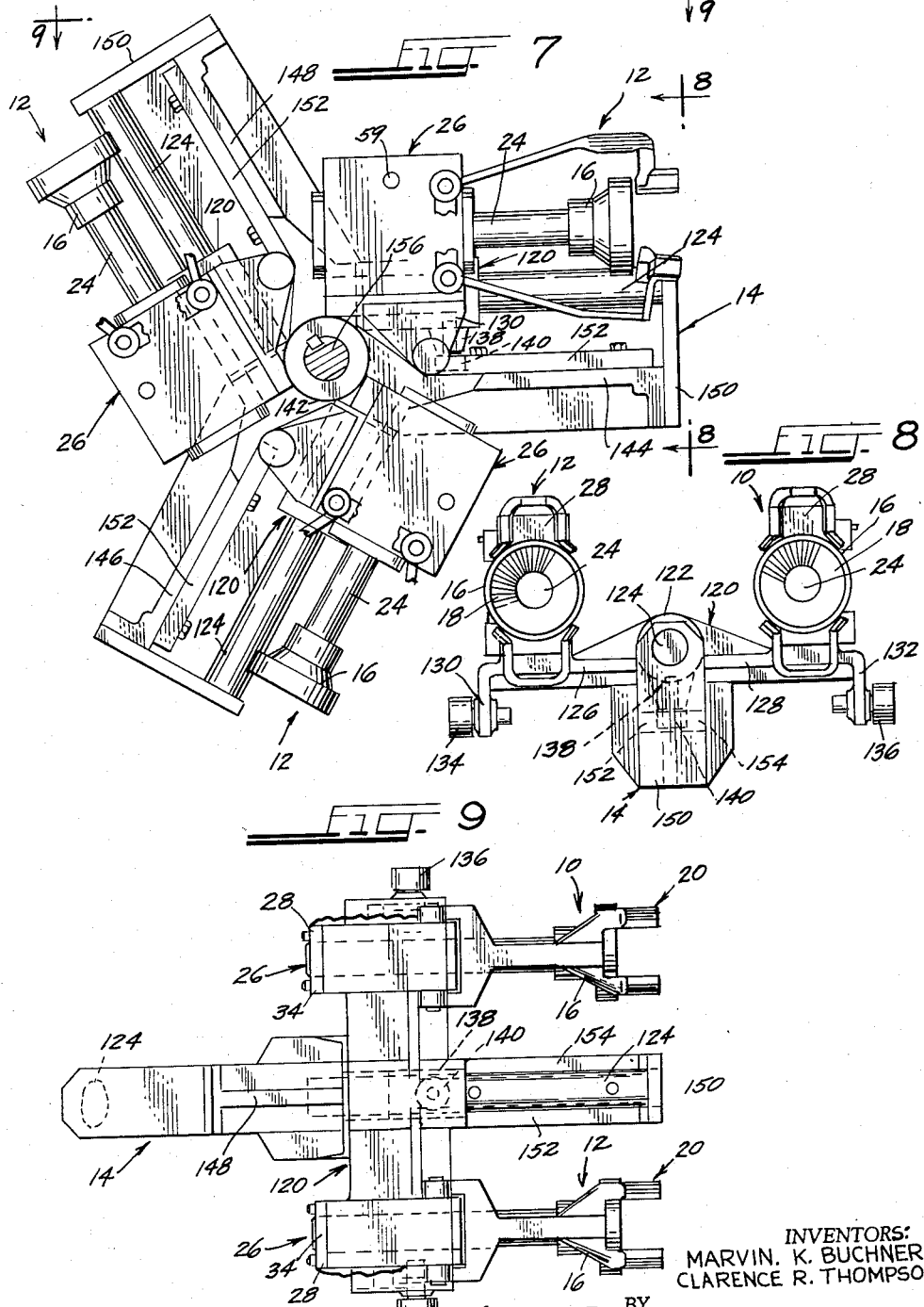
INVENTORS:
MARVIN. K. BUCHNER
CLARENCE R. THOMPSON
BY

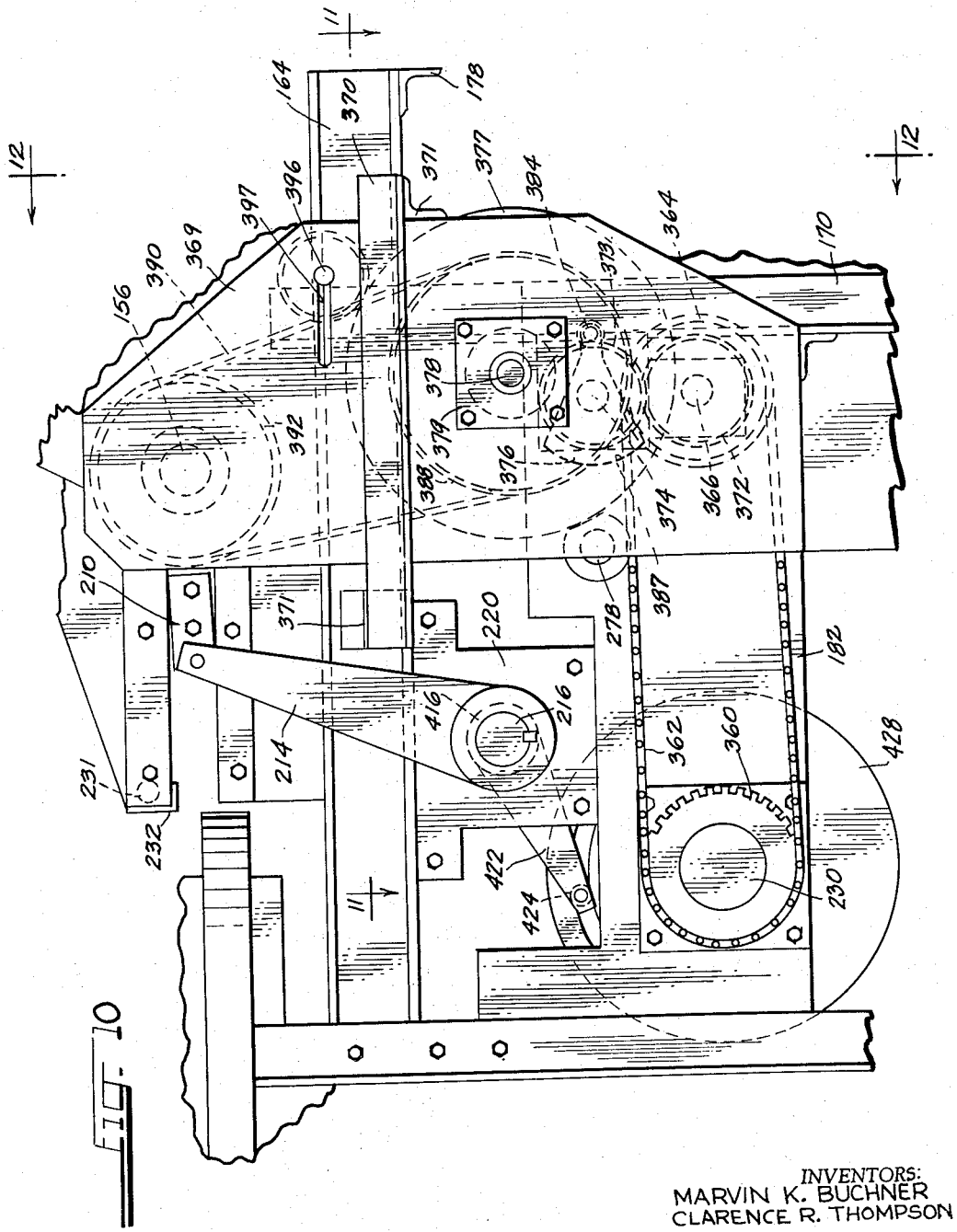

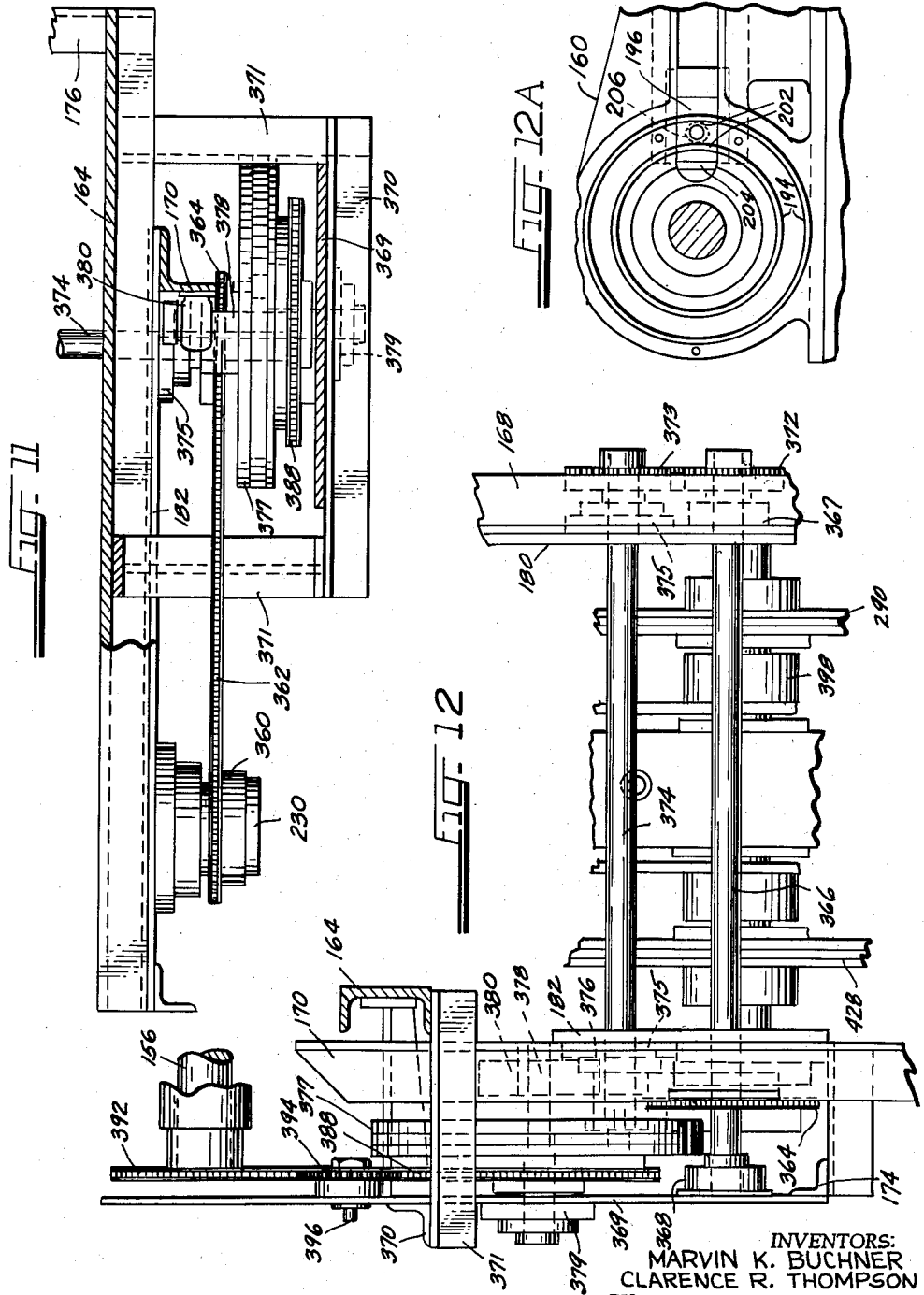

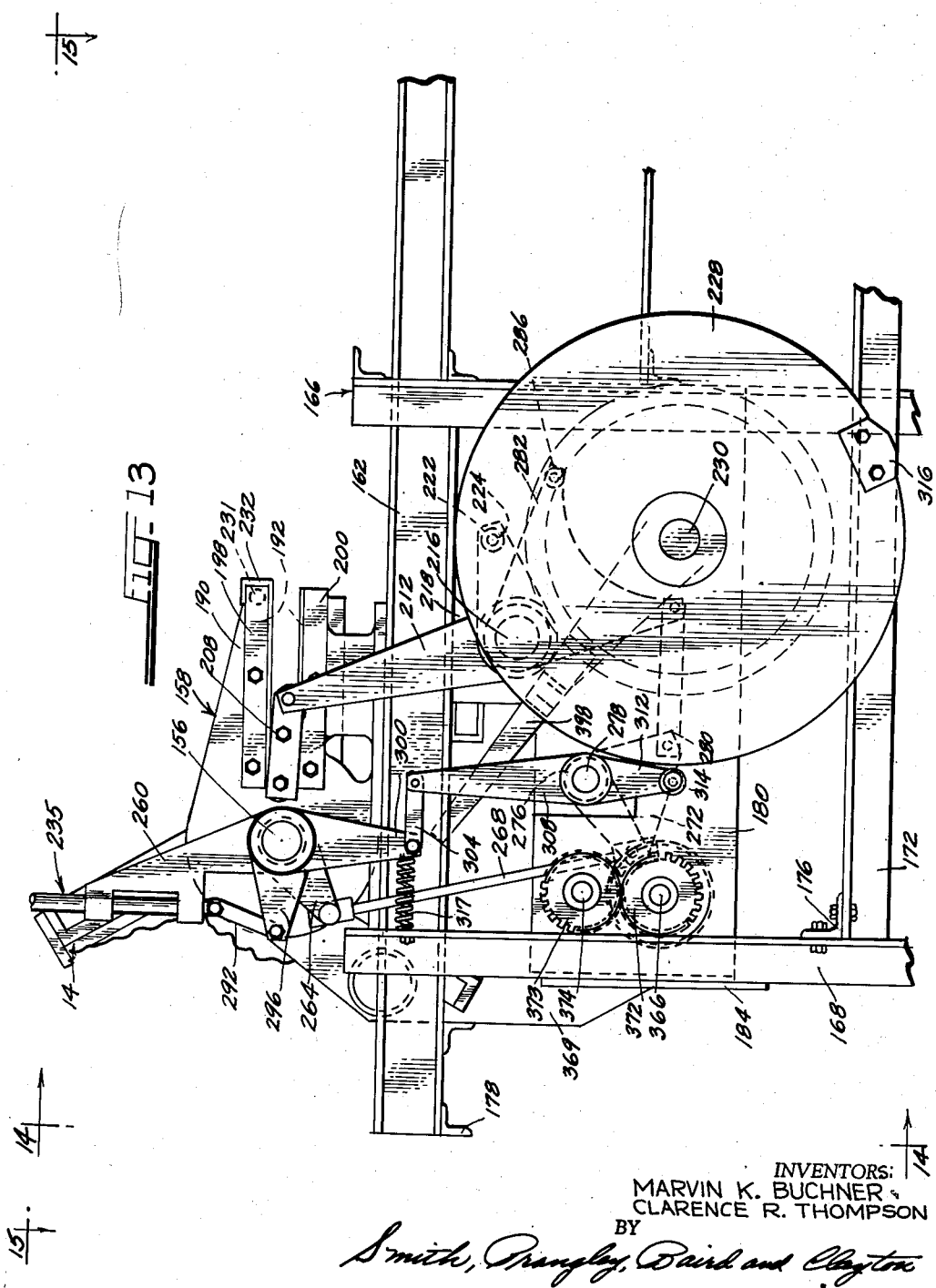

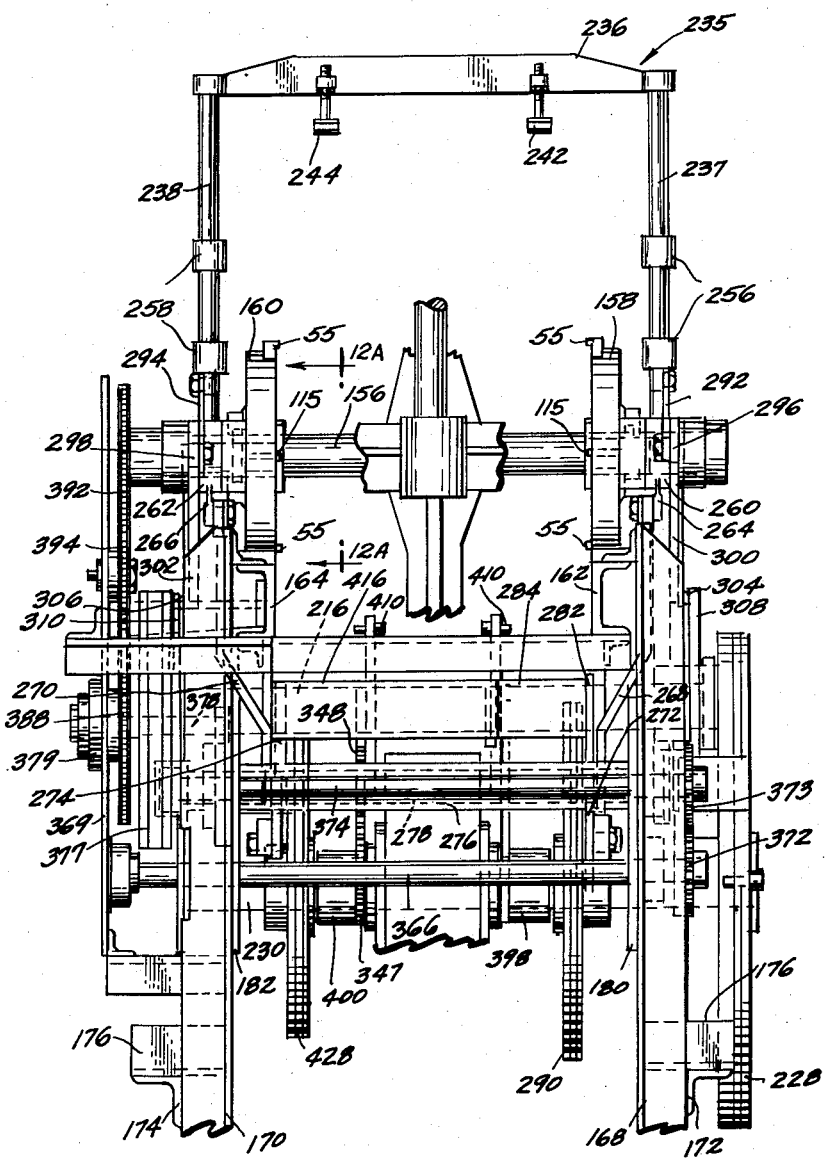

Sept. 20, 1960 M. K. BUCHNER ET AL 2,953,236
PEAR FEEDER
Filed May 2, 1958 18 Sheets-Sheet 12
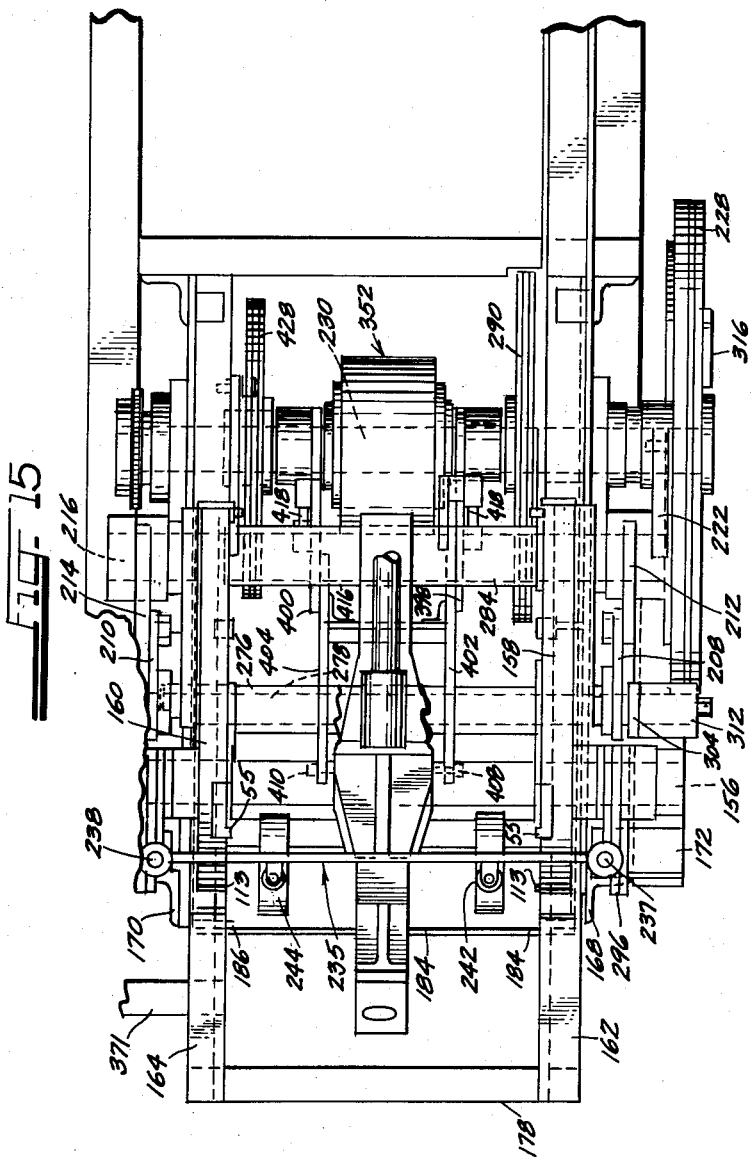
INVENTORS:
MARVIN K. BUCHNER
CLARENCE R. THOMPSON

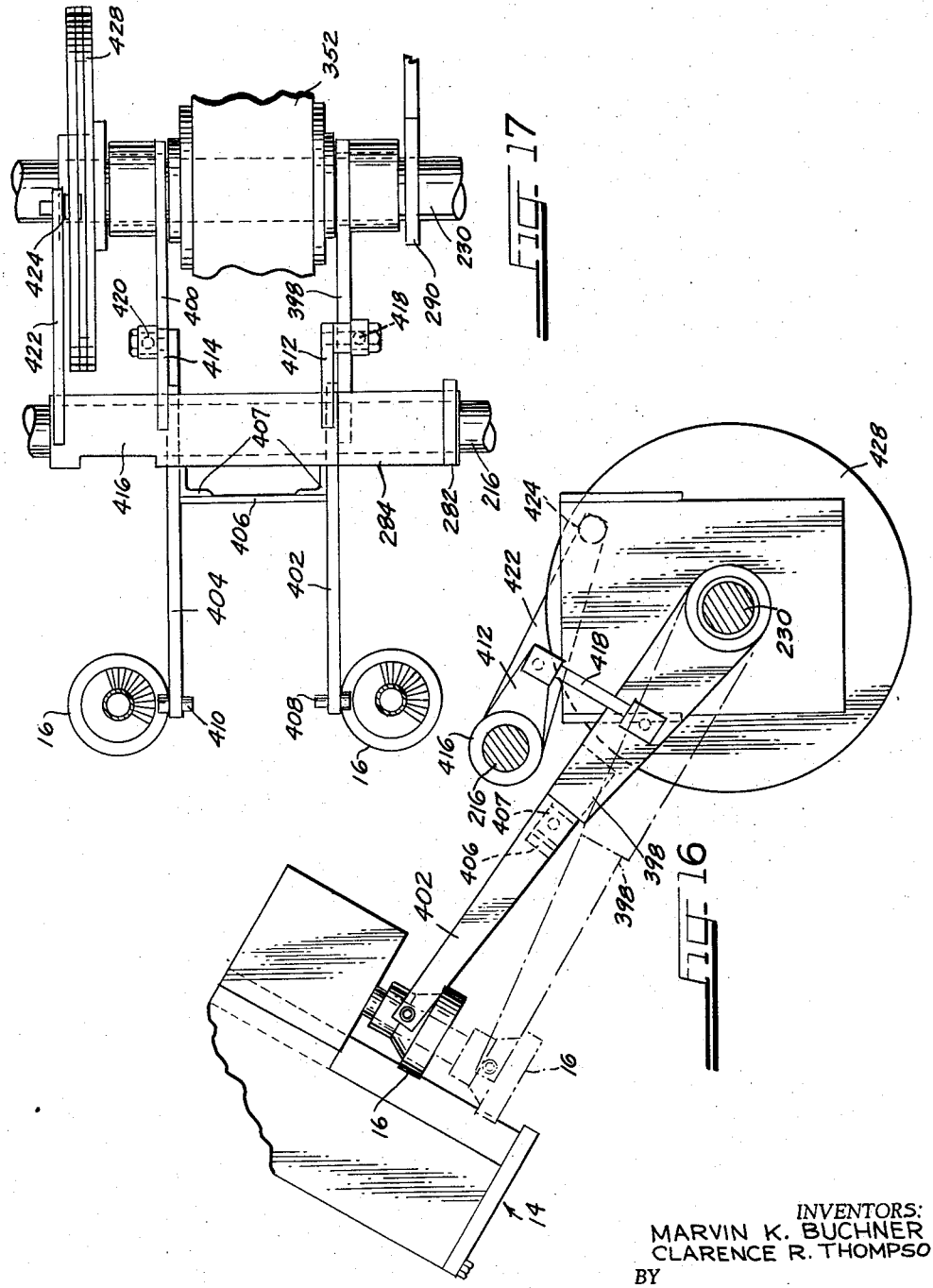

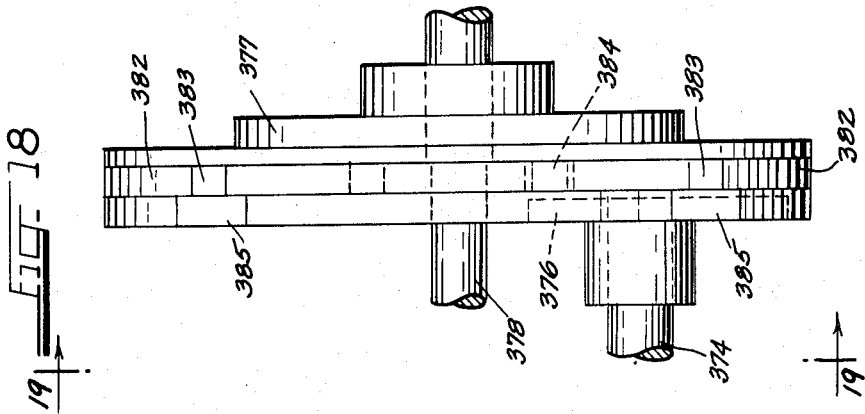
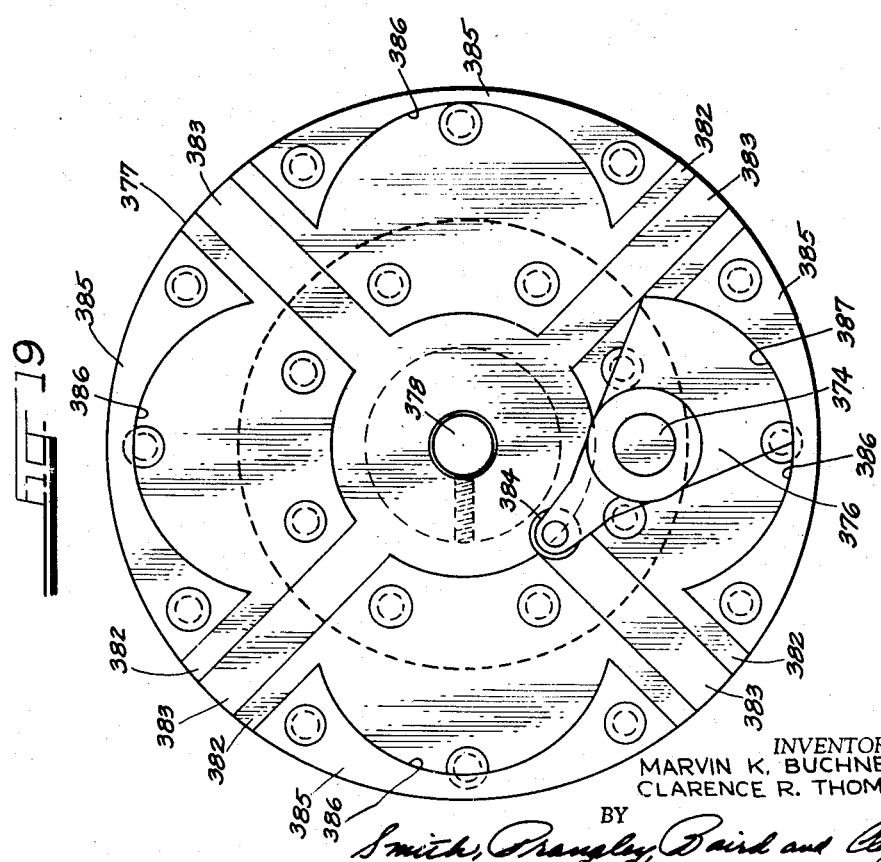

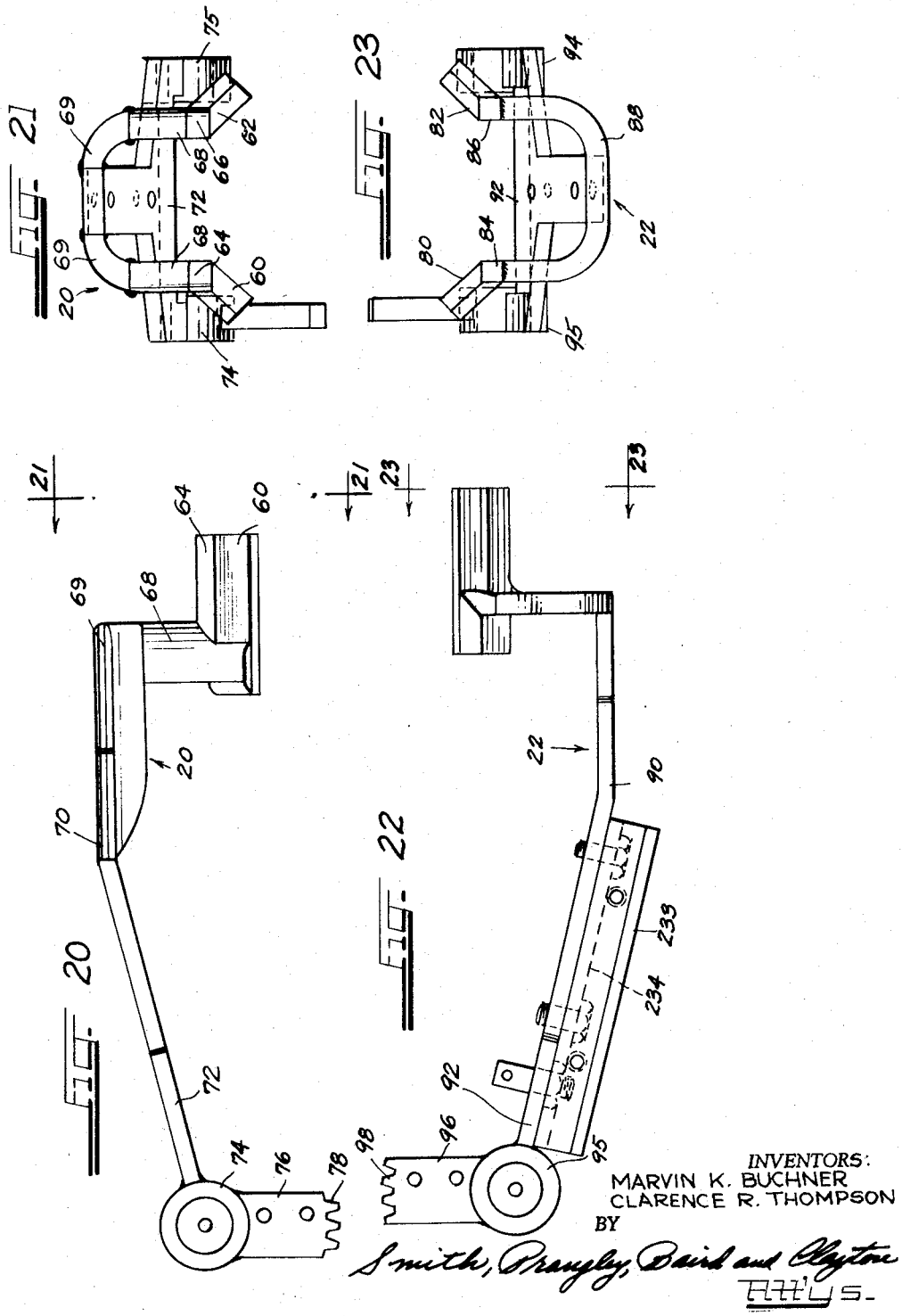

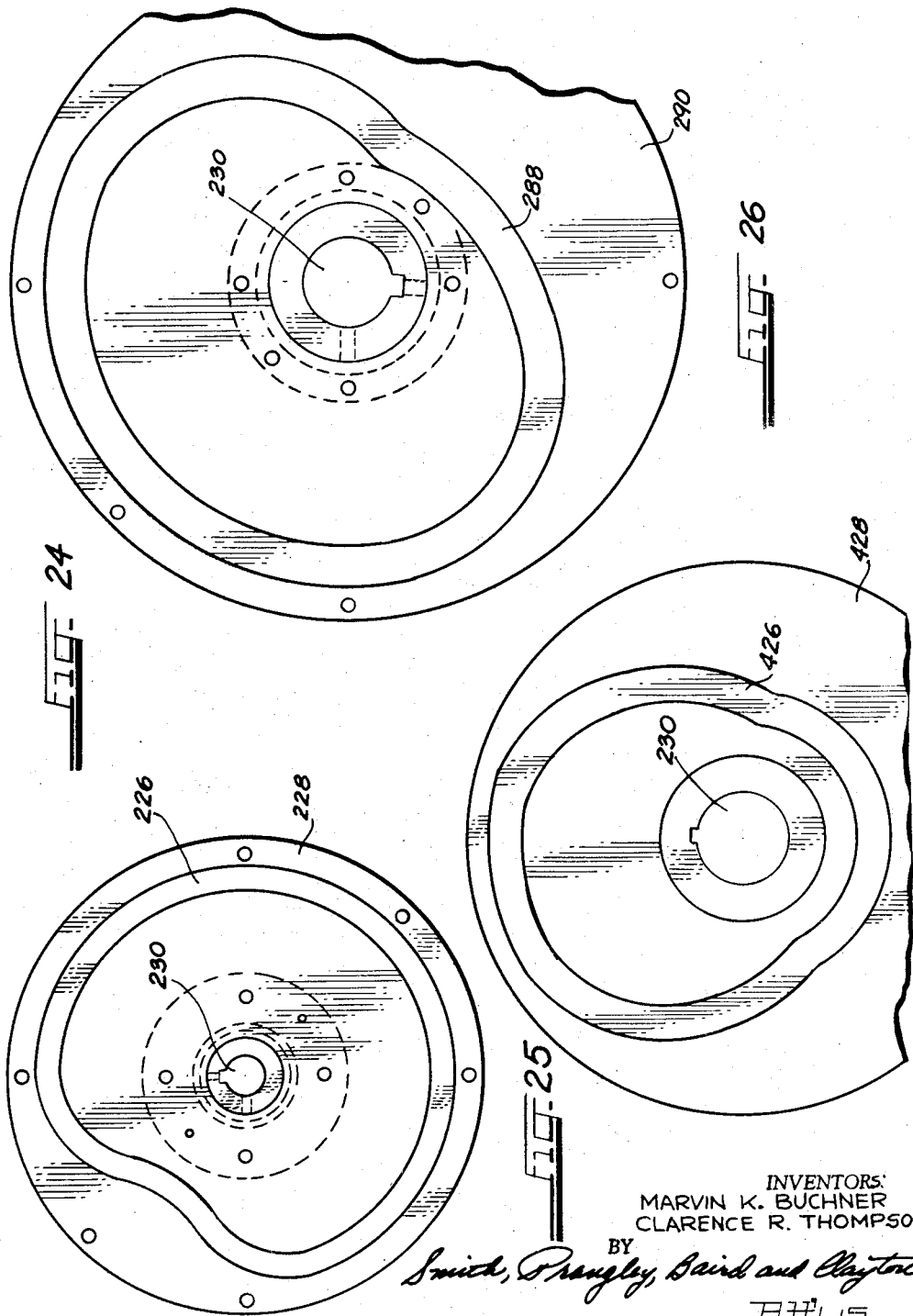

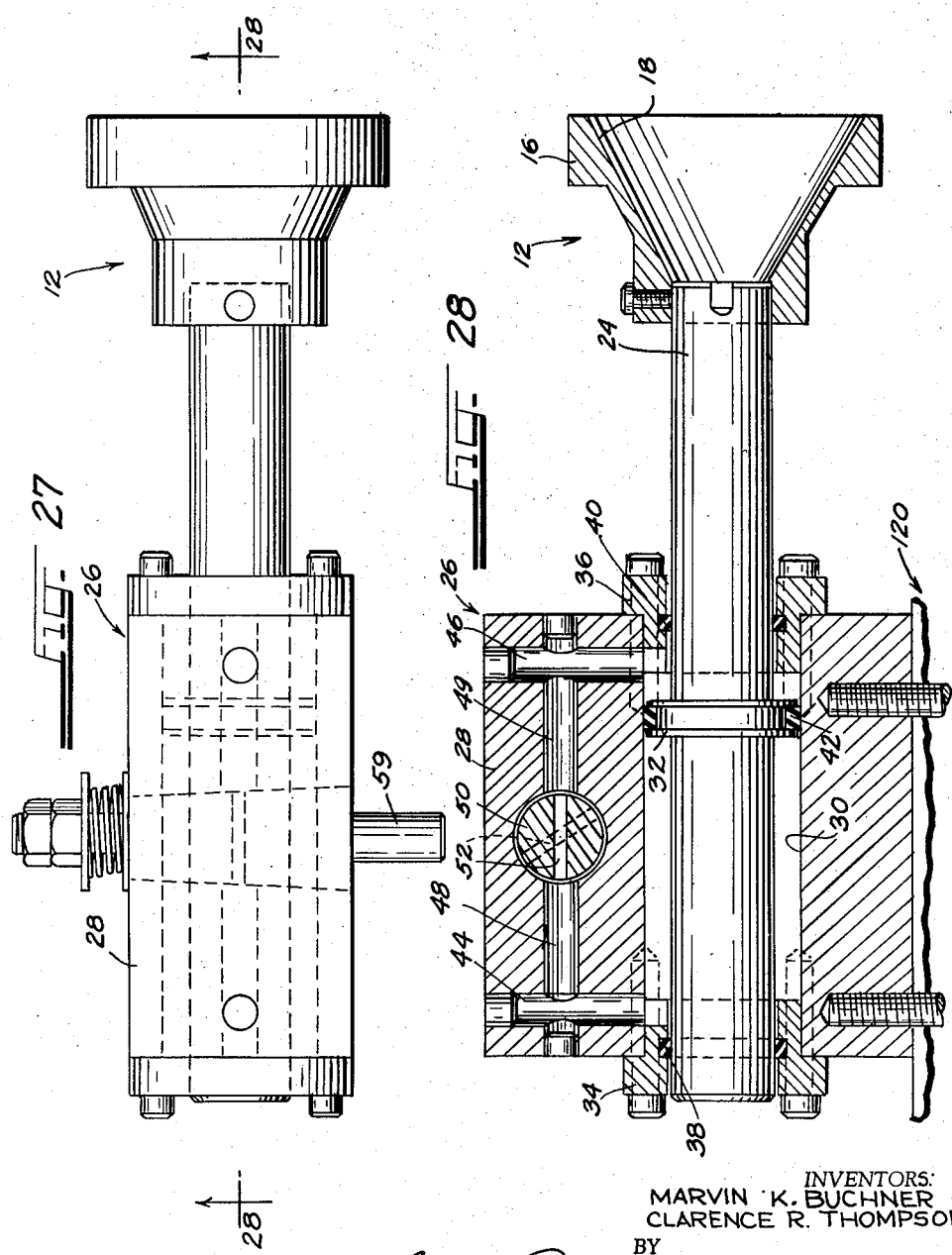

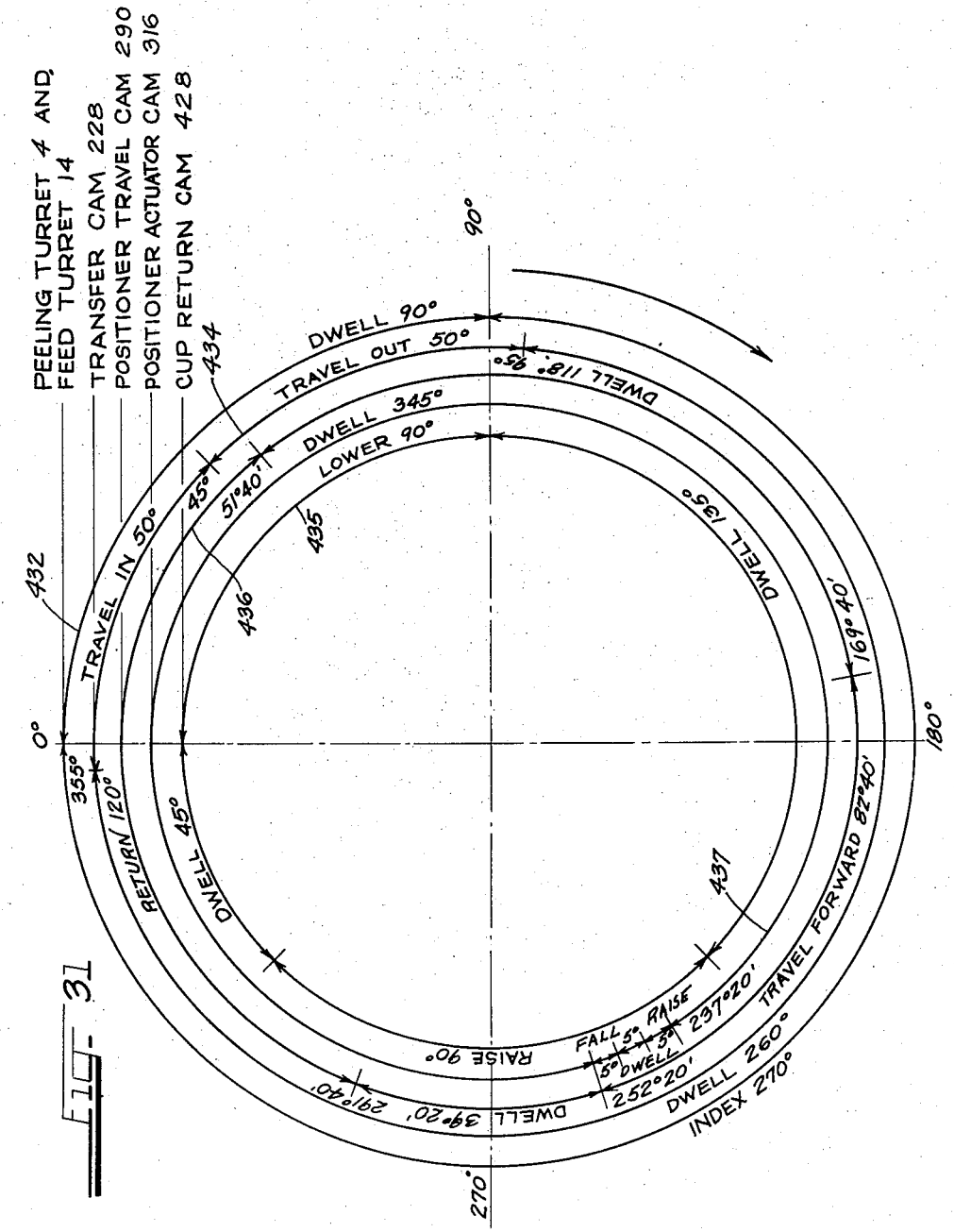

United States Patent Office 2,953,236
Patented Sept. 20, 1960

2,953,236

PEAR FEEDER

Marvin K. Buchner and Clarence R. Thompson, Olympia, Wash., assignors, by mesne assignments, to Food Machinery and Chemical Corporation, San Jose, Calif., a corporation of Delaware Filed May 2, 1958, Ser. No. 732,555

25 Claims. (Cl. 198—33)

This invention relates to a pear feeder machine or mechanism, and more particularly to a feeder for aligning pears with respect to, and for placing them on, the peeling spindles or stemming tubes of a pear preparation or processing machine.

Pear aligning orienters or feeders as heretofore constructed have not been entirely satisfactory in use because of their inability properly to align or handle ungraded pears to the same extent or rate as the pear preparation or processing machines with which the feeders were associated or in which they were included. Accordingly, the quality of output, the rate of production and the extent of usefulness of such pear preparation or processing machines have been limited by the pear aligning feeder machine or mechanism associated therewith. It is, therefore, an object of this invention to provide a pear feeder capable of handling and aligning pears ungraded as to size and placing them in predetermined positions on the peeling spindles or stemming tubes of a pear preparation or processing machine, such for example as disclosed in the copending application of Clarence R. Thompson and Marvin K. Buchner, S.N. 691,818, filed October 23, 1957.

In prior pear preparation or processing machines having peeling spindles or stemming tubes upon which the fruit is received and by which it is held during processing, it is necessary, or at least desirable for best performance, that each pear be positioned on each spindle or tube with its butt end located at a predetermined point lengthwise of the spindle or tube for proper registry with the processing or peeling mechanisms. It is accordingly a further object of this invention to provide a pear feeder by which ungraded pears shall be placed on the peeling spindles or stemming tubes in such registered or predetermined positions, regardless of pear lengths.

Other and further objects of the invention are to provide a pear orienter or aligner automatically self-adjustable to accommodate any size pear likely to be encountered in a commercial canning operation; to provide a pear orienter or aligner automatically centering each pear along its major or stem axis and placing each pear in registered position in a pear preparation or processing machine; to provide a pear orienter or aligner of relatively simple construction having gentle motions and providing a manual feeding station so arranged as to cause a minimum of fatigue to an operator; to provide a rotary pear feeder with hydraulically controlled self-adjusting mechanisms for positioning each pear in a predetermined radial position, with respect to its butt end, regardless of pear length; and to provide a radial pear feeder with multiple sets of dual pear receiving and feeding units conjointly operated to receive and feed two pears at a time and independently adjustable to position the butt ends of the pear, regardless of length, at the same radial distance from the axis of rotation of the feeder.

Still other and further objects and advantages of the invention will be apparent from the following description when taken in conjunction with the accompanying drawings wherein:

Figure 1 is a fragmentary view in perspective of a pear preparation or processing machine equipped with a pear feeder embodying the present invention, Figure 2 is a view in perspective of the machine of Figure 1 but with the parts in different positions of operation, Figure 3 is a fragmentary view in perspective of the feeder of Figure 1, Figure 4 is a view in vertical elevation of a fruit holder or feed cup and pear centering clamp assembly forming part of the feeder of Figure 1, Figure 5 is a plan view of the holder or assembly of Figure 4, Figure 6 is an end view of the holder or assembly of Figure 4, Figure 7 is a view in elevation illustrating the mounting of the fruit holders or feed cup and clamp assemblies on a common vertical turret or spider, Figure 8 is a fragmentary view in elevation taken along the line 8—8 of Figure 7, Figure 9 is a fragmentary plan view taken along the line 9—9 of Figure 7, Figure 10 is a fragmentary view in elevation illustrating the drive mechanism for the feeder spider or turret, Figure 11 is a fragmentary view in horizontal section taken along the line 11—11 of Figure 10, Figure 12 is a fragmentary view in vertical section taken along the line 12—12 of Figure 10, Figure 12A is a fragmentary view in vertical section taken along the line 12A—12A, Figure 14, Figure 13 is a fragmentary view in elevation taken from the opposite side of the machine from Figure 10 and illustrating additional of the feeder actuating or drive mechanisms, Figure 14 is a fragmentary view in vertical elevation looking along the line 14—14 of Figure 13, Figure 15 is a plan view looking along the line 15—15 of Figure 13, Figure 16 is a fragmentary view in elevation of a cup return mechanism forming part of the feeder of Figure 1, Figure 17 is a view in section taken along the line 17—17 of Figure 16, Figure 18 is a fragmentary view in elevation showing the Geneva drive connection between two of the driving shafts for the feeder turret or spider, Figure 19 is a view in elevation looking along the line 19—19 of Figure 18, Figure 20 is a view in elevation of a pear centering clamp arm forming part of the fruit holder or feed cup and centering clamp assembly, Figure 21 is an end view of the clamp arm of Figure 20, Figure 22 is a view in elevation of the companion clamp arm, Figure 23 is an end view of the clamp arm of Figure 22, Figures 24 to 26 are views in elevation of certain cams controlling the feeder actuating mechanisms, Figure 27 is a plan view of a feed cup arm and its hydraulic control unit, Figure 28 is a view in vertical section taken along the line 28—28 of Figure 27, Figure 29 is a fragmentary view in the horizontal section of the drive mechanism forming part of the machine of Figure 1, Figure 30 is a fragmentary view in vertical section taken along the line 30—30 of Figure 29, and Figure 31 is a timing diagram illustrating the operation of the pear feeder.

In Figures 1 to 3 of the drawings, a pear feeder machine or mechanism embodying the invention is shown in association with the pear preparation or processing machine 2 disclosed in the copending application of Clarence R. Thompson and Marvin K. Buchner, S.N. 691,818, filed October 23, 1957, and including a horizontal turret 4 rotating on a vertical axis as shown in said application and carrying a plurality of pairs of peeling spindles or stemming tubes 6 and 8 successively presented, by the intermittent rotation of the turret, to a pear receiving station as illustrated in Figures 1 and 3. At such station, two pears are simultaneously impaled upon the peeling spindles or stemming tubes and are thereafter peeled, bobbed, cored and discharged from the spindles prior to their return to the receiving station.

A pear feeder machine or mechanism which forms the subject matter of the present invention comprises a plurality of pairs of fruit holders or feed cup and clamp assemblies 10 and 12 carried by a vertical turret or spider assembly 14.

As best shown in Figures 1 to 9, 27 and 28, each fruit holder or feed cup and clamp assembly comprises a cup 16 having a conical inner wall 18, Figure 28, for receiving and automatically centering the stem end of a pear placed stem end foremost into the cup. Each fruit holder also includes a pair of complementary clamps or jaws 20 and 22 extending beyond the feed cup 16.

Each feed cup 16 is mounted for axial adjustment, on the end of a piston rod 24 of a hydraulic position control or locking mechanism 26 which comprises a main body casting 28 having a cylinder bore 30, Figure 28, receiving a piston 32 carried by the piston rod 24. The piston rod 24 is slidably mounted in bearing blocks 34 and 36 bolted to the body casting 28 at the opposite ends of the cylinder bore 30 and provided with synthetic rubber O-rings 38 and 40 preventing leakage of hydraulic fluid from the cylinder along the piston rod. The piston 32 is also provided with a synthetic rubber O-ring 42 to prevent liquid leakage from one side to the other of the piston. The main body casting 28 is provided with transverse fluid passages 44 and 46 in open communication with longitudinal fluid passages 48 and 49 between which communication is controlled by a tapered plug valve 50 rotatably mounted in a transverse tapered plug in the main body casting and having a diametric flow-restricting orifice, port or passage 52 adapted to connect the longitudinal passages 48 and 49 upon turning of the valve to the full line position shown in Figure 28 and thereby permit hydraulic fluid to flow at a determined rate from one side of the piston to the other as the piston traverses the cylinder 30. When the port 52 of the valve 50 is in the dotted line position shown in Figure 28, the connection between the passages 48 and 50 is broken and the hydraulic fluid is trapped on both sides of the piston thereby latching or locking the piston against movement.

A valve actuator 54, having angularly spaced actuator arms 56 and 58, Figures 3 to 5, is adjustably secured to the reduced end portion 59 of the stem of the valve 50.

Each fruit clamp or jaw 20 comprises, Figures 1 to 9, 20 and 21, a pair of relatively diverging fruit engaging and centering plates or bars 60 and 62 welded to parallel bars 64 and 66, in turn welded to parallel arms 68, adapted to extend over an associated cup 16. Arms 68 are fixed to spaced arms 69 welded to the outer end of a bent lever arm 70 having at its opposite end a bifurcated plate like portion 72 welded to bosses 74 and 75. A lever 76 is welded to boss 74 in angularly spaced relation to the lever arm 70 and is formed at its outer end with teeth forming a gear segment 78.

Each fruit clamp or jaw 22, Figures 1 to 9, 22 and 23, comprises fruit engaging and centering plates or bars 80 and 82 relatively diverging at the same angle as the fruit engaging and centering plates or bars 60 and 62 of jaw 20 and being welded to parallel bars 84 and 86 in turn welded to a yoke 88 adapted to extend over its associated cup 16 and welded to the outer end of a bent lever 90, having the same angle of bend as the lever 70, and similarly formed at its other end with a bifurcated plate portion 92 welded to bosses 94 and 95. A lever 96 is welded to the boss 95 and is formed at its outer end with teeth forming a gear segment 98 adapted to mesh with the gear segment 78 of the jaw 20.

The bosses 74, 75 and 94, 95 of the jaws 20 and 22 are journalled on stud bolts 99 threaded into the main body casting 28. A coil spring 100, secured at its opposite ends to pins 102 and 104 carried by the plate portions 72 and 92 of each pair of jaws 20 and 22, urges the jaws of each pair toward closed position, as illustrated in dashed lines in Figure 4.

The jaws 20 and 22 of each pair are held in opened position by a latch bar or keeper 106, Figure 4, which is bolted to the lever arm 76, and a pivoted latch or pawl 108 journalled on a pivot stud 110 carried by a bracket 112 bolted to the outer side of the body casting 28. The pivoted latch 108 is provided with an outwardly extending arm 113 to which a latch loading spring 114 is secured by pin 116. The other end of the spring is secured to a retainer pin 118 carried by the body casting 28.

Each pair of fruit holders or feed cup assemblies 10 and 12 is mounted on a carriage 120, Figures 3 and 6 to 9, each carriage having a central hub portion 122 slidably mounted on a rod 124 of the turret or spider assembly 14. Each carriage 120 is provided with arms 126 and 128 extending oppositely from the hub 122 and the body casting 28 of the feed cup assemblies 10 and 12 are bolted to the arms 126 and 128, the feed cup assemblies being spaced apart on the carriage so that the distance between the centers or axes of the piston rods 24 is equal to the distance between the centers or axes of the pear peeling spindles or stemming tubes 6 and 8 of the pear preparation or processing machine 2.

Each carriage 120 is formed at its opposite ends with depending flanges 130 and 132 carrying guide rollers 134 and 136. Each carriage is also formed with a lug or boss 138 depending from the center hub portion 122 and carrying a guide roller 140.

The turret or spider assembly 14, Figures 1 to 3, 7 to 9, 14 and 15, comprises a casting having a central hub portion 142 and three angularly spaced arms 144, 146 and 148. Plates 150 are bolted to the outer ends of the spider arms 144, 146 and 148 and extend transverse of the arm to support the outer ends of the guide rods 124 for the three carriages 120. The inner ends of the guide rods 124 are mounted in suitable apertures, not shown, in the inner ends of the spider arms adjacent the center hub portion 142 and are fastened in any convenient manner to the spider arms. Spaced guide bars 152 and 154 are bolted to each spider arm to receive between them the guide roller 140 of the associated carriage 120 so as to prevent the carriage from turning about the axis of the associated guide rod 124. The central hub portion 142 is keyed or otherwise secured to a drive shaft 156.

The shaft 156 is journalled in bearing brackets 158 and 160, Figures 13 to 15, mounted on channel members 162 and 164 extending forwardly from the main frame 166 of the pear preparation or processing machine 2 and supported on front legs 168 and 170, carried by the same side beams 171 and 173 as the pear machine 2.

Longitudinal frame members 172 and 174 also extend forwardly from the main frame 166 of the pear preparation or processing machine 2 and are secured to the front legs 168 and 170 as by angle brackets 176. A cross brace 178 joins the frame members 162 and 164 at their forward ends. Tie plates 180 and 182, Figures 10 to 15 and 20, are fixed to the front legs 168 and 170 and to the front legs of the main frame 166 of the pear preparation or processing machine. A tie plate 184 extends between the front legs 168 and 170 and is secured thereto through angle members 186 and 188 bolted to the tie plate and to the front legs.

The bearing brackets 158 and 160 are complementary in form, each being provided with latch tripping pins or lugs 115 in the path of the arms 113 of the latches 108, and with valve actuating pins or lugs 55 in the path of the lugs 56 and 58 of the valve actuators 54. Each bracket is also provided with a laterally extending arm portion 190 having a guide slot 192, Figures 13 and 12A, communicating at its inner end with a circular guide slot or groove 194 in the inner face of the bracket, the guide slot 194 being concentric to the axis of the shaft 156. The guide grooves or slots 194 in the brackets 158 and 160 receive the carriage guide rollers 134 and 136. A slide block 196, Figure 12A, is fitted to slide in the slot 192 of each bracket 158 and 160 and retained therein between guide bars 198 and 200 bolted to the arm 190 of the bracket. Each slide block 196 is formed with a part circular slot or groove 202, the walls of the groove 202 being of the same radii as the walls of the groove 194 and being adapted to register with the walls of the groove 194 when the slide block is positioned at its inner limit of movement in the slot 192. The grooves 202 in the slide blocks 196 receive the guide rollers 134 and 136 of the carriages 122 from the guide grooves 194. On outward movement, the slide blocks transfer the carriage rollers from the guide grooves 194 to the guide slots 192 and on inward movement the slide blocks return the rollers to the guide grooves 194. A spacer block 204, Figure 3, is pivotally attached to each slide block 196 by a pivot bolt 206 and the spacer block is bolted to links 208 and 210 on opposite sides of the machine, Figures 13 and 10, to actuating levers 212 and 214 fixed to the opposite ends of a cross shaft 216. The cross shaft 216 is journalled in suitable bearing blocks 217 carried by mounting plates 218 and 220 fastened to the tie plates 180 and 182 and the channel members 162 and 164. The lever 212 is in the form of a bell crank having a lower arm 222 provided at its outer end with a cam roller 224 which runs in the internal cam track 226, Figure 25, of a cam 228 secured to the main drive shaft 230.

It will be evident that the cam 228 causes reciprocation of a carriage 120 when the turret 14 is at rest and the carriage to be reciprocated is positioned, at the feeder discharge station, with its associated pair of fruit holders 10 and 12, in alignment with a pair of peeling spindles or stemming tubes 6 and 8 positioned at the receiving station of the pear processing machine 2, as illustrated in Figures 1 and 3. Jaw or clamp opening means or mechanism, Figures 3, 4, 5, 10, 13 and 22, is provided to open the jaws or clamps 20 and 22 of the pair of fruit holders 10 and 12 at the feeder discharge station as the carriage 120 at that station is being advanced and the pears have been partially impaled, butt ends foremost on the stemming tubes. This opening means or mechanism comprises a pair of fixed actuating rollers 231 carried by brackets 232 fastened to the inner free ends of bearing brackets and guides 158 and 160. The rollers 231 are positioned in the path of movement of actuating or camming tracks 233 fastened to angle bars 234 bolted to and extending laterally from the bent arms 90 of the clamps 22 at the proper camming angle to the horizontal path of movement of the carriage 120 and the horizontal plane through the axes of the rollers 231 to effect the opening of the clamp jaws 22 as the flanges of the tracks 233 engage and traverse the fixed rollers 231.

Pear positioning means 235, Figures 1 to 3 and 14, is provided for positioning the centering cups of the pear holders different distances from a predetermined reference plane or cylinder concentric to the spider axis dependent on the lengths of the individual pears so that the blossom or butt ends of the pears will always contact the reference plane or cylinder at a fixed radial distance from the axis of rotation of the feeder turret or spider assembly and, therefore, as delivered to the peeling spindles or stemming tubes of the fruit preparation or processing machine 2, the butt ends of the pears will be always aligned, or positioned on each spindle or tube at a fixed point or radial distance from the axis of rotation of the turret of the fruit preparation machine. This positioning means 235 comprises a positioner beam 236 adjustably secured to the outer threaded ends of rods 237 and 238, the beam being held in adjusted position on the rods as by clamp nuts 240. Fruit engaging and positioning buttons or shoes 242 and 244 are fixed to the lower end of threaded pins 246 and 248 adjustably mounted in lugs 250 and 252 fixed to the positioner beam 236, the pins being secured in adjusted position, in transverse alignment, as by clamping nuts 254. The rods 237 and 238 are slidably supported in guides 256 and 258 formed on brackets 260 and 262 journalled on shaft 156. The brackets 260 and 262 are formed with arms 264 and 266 pivoted to link rods 268 and 270. The link rods 268 and 270 are pivotally connected at their lower ends to levers 272 and 274 fixed to the ends of a sleeve 276 journalled on a cross shaft 278. The lever 272 is formed as a bell crank having its other arm pivoted to one end of a link 280 having its opposite end pivotally connected to a bell crank 282 having a hub 284 journalled on shaft 216, the bell crank 282 having on its other arm a cam roller 286 which runs in the internal cam track 288, Figure 24, of a cam 290, Figures 14 and 24, keyed to the shaft 230, Figures 1, 2 and 13. The cam track 288 is so formed as to cause the brackets 260 and 262, and hence the positioner beam 236 and shoes 242 and 244, to swing angularly at the same rate as the feeder turret assembly 14 during the time that the shoes 242 and 244 are in engagement with the fruit.

The lower ends of rods 237 and 238 are connected by means of links 292 and 294 to levers 296 and 298 journalled on shaft 156. The levers 296 and 298 are in the form of bell cranks having arms 300 and 302 connected by links 304 and 306 to levers 308 and 310 secured to the ends of shaft 278. A lever 312 is fastened to the hub of the lever 308 and carries at its free end a cam roller 314 adapted to be actuated by an edge cam 316 fastened to the external face of cam 228. Coil springs 317, one only being shown, secured to the lever arms 300 and 302 and to anchor pins 318 secured to the legs 168 and 170, hold the levers 296 and 298 against turning except when the cam roller 314 is actuated in a clockwise direction by cam 316, the springs serving to return these levers to their normal positions as the cam 316 passes the cam roller 314. It should be noted that the cam roller 314, except when it is actuated by the cam 316, is held against counterclockwise movement by the engagement of the lever 308 with an adjustable stop bolt 319 on a bracket 320. Therefore, as the brackets 260 and 262 are rotated in the same direction as the feeder turret 14 the levers 296 and 298 act as anchors for the lower ends of the rods 237 and 238 and thereby pull the rods downward or radially inward relative to the axis of the turret. It will be evident that the cam 316 causes additional downward or inward travel of the rods 237 and 238 as it causes the levers 296 and 298 to swing downward. The springs 317 cause a quick outward travel of the rods 236 and 238 as the cam roller 314 drops off the end of the cam 316.

The drive mechanism, Figures 1, 2, 10 to 15, 18, 19, 29 and 30, for intermittently rotating the turret or spider assembly 14 comprises a motor 322, Figures 2, 29 and 30, mounted on a swing base 324 pivoted by rod 326 on brackets 328 fastened to the lower side beam 173 of the machine and supported on its other end on a hanger rod or bolt 330 freely movable in support plate 332 carried by the opposite side beam 171 of the machine, the downward movement of the hanger rod being limited by the adjustment and clamping nuts 334.

An adjustable, variable-speed pulley 336 is mounted on the motor shaft and coupled by a drive belt 338 to a pulley 340 secured to a drive shaft 342. The shaft 342 is journalled in a suitable bearing 343 mounted on the tie plate 184 and in a suitable bearing 344 mounted on a bracket 345 bolted, through a spacer block, to a cross bar 346 extending between the side members 172 and 174 of the machine frame. The shaft 342 is coupled by suitable gears 348 and 349 to an input shaft 350 of a speed reducer mechanism or gear unit 352. The speed reducer 352 is mounted on a platform 354 supported by the cross bar 346 and a similar cross bar 356.

The speed reducer output shaft 357 drives the pear machine 2, as disclosed in said copending application, and the speed reducer unit 352 also drives the feeder shaft 230, which latter shaft is journalled at its opposite ends in suitable bearings (not shown) secured to the machine frame side plates 180 and 182. A sprocket 360 is fixed to one end of the shaft 230 and coupled by chain 362 to a sprocket 364 mounted on a cross shaft 366. The shaft 366 is journalled on a bearing 367 carried by the side plate 180 and in a bearing 368 carried by a side plate 369. The side plate 369 is supported by the side frame member 174 and an angle bar 370 fastened to cross bars 371 fixed to the channel member 164. A gear 372 secured to shaft 366 meshes with a gear 373 secured to a cross shaft 374 so as to drive the shaft 374 at the same speed but in the opposite direction to shaft 366. The shaft 374 is journalled in bearings 375 carried by the side plates 180 and 182.

A Geneva crank 376 (Figures 10, 18 and 19) is fixed to one end of shaft 374 and drives an internal four-slot Geneva wheel 377 secured to a shaft 378 mounted in bearings 379 and 380 secured to plate 369 and front leg 170. The Geneva wheel 377 has fixed to it four segments 382 machined to form slots 383 to receive the roller 384 of the Geneva crank 376 and four sectors 385 forming locking surfaces 386 to engage the complementary locking surface 387 of the Geneva crank. A sprocket 388 is adjustably secured to the Geneva wheel 377 for purposes of timing adjustment and is coupled by means of a chain 390 to a sprocket 392 fixed to one end of the turret or spider assembly shaft 156. A chain tightner sprocket 394 is mounted on a stud 396 mounted for adjustment along a slot 397 in the vertical side plate 369. The stud 396 is adjusted along the slot 397 as may be desired so that the tightner sprocket 394 is positioned to take the slack out of the chain 390.

Cup returning means or mechanism (Figures 10 and 13 to 17) comprises levers 398 and 400 journalled on shaft 230. Extension bars 402 and 404 are welded to the levers 398 and 400 and are joined by a stiffening bar 406 fastened to brackets 407 welded to the extension bars. Pins or buttons 408 and 410 on the outer ends of levers 398 and 400 are positioned to engage the rim flanges of cups 16, in one position of the turret 14, and return or move the cups outwardly on downward movement of the levers, as illustrated by the dashed lines of Figure 16.

The levers 398 and 400 are actuated by levers 412 and 414 welded to a sleeve 416, link rods 418 and 420 being pivoted to levers 398 and 400 and to the ends of levers 412 and 414. Sleeve 416 is journalled on shaft 216 and has welded to it an actuating lever 422 carrying at its free end a cam roller 424 received in the internal cam track 426 (Figure 26) of a cam 428 keyed to main cam shaft 230, Figures 14, 15 and 17.

A motor control switch box 429, Figures 1 and 2, may be mounted at the operators station, as for example, upon a supporting bar 430 upstanding from the front leg 170.

In Figures 1 and 3 of the drawings, the turret or spider assembly 14 is shown in a position of rest with a pair of fruit holders or feed cup assemblies 10 and 12 at the feeding station, and another pair of fruit holders at the discharge station, the third pair of fruit holders being at that time at the cup-return station. When the fruit holders are at rest, an operator simultaneously inserts two pears in the holders at the feeding station by placing the neck ends of the pears in the centering cups 16, which automatically center the stem ends of the pears with respect to their stem axes. The feed turret may be assumed to be in the zero angle position of the timing circle 432 of the timing diagram of Figure 31, which is based upon a single revolution of the Geneva drive shaft 374. At this time the centering jaws 20 and 22 associated with each of the feed cups at the feeding station and the cup-return station are held open by the latch members 106 and 108 and the jaws 20 and 22 associated with the feed cups at the discharge station are in closed position grasping the butt ends of the pears, as shown in Figure 3, and serving, with the centering cups, to aline the stem axes of the pears with the peeling spindles or stemming tubes 6 and 8.

As the feed turret 14 approaches rest position, the rollers 134 and 136 of the carriage 120, which is approaching the discharge station, pass from the circular guide grooves 194 in the bearing brackets 158 and 160 into the guide slots 202 of the slide blocks 196, and the transfer cam 228 begins to rotate the shaft 216, Figures 13 to 15, through the lever 222. Such rotation of the shaft 216 causes outward reciprocation of the slide blocks 196, generally radially of the turret 14, through levers 212, 214, links 208 and 210 and spacer blocks 204 thereby to advance or move the carriage 120 and the fruit holders 10 and 12 carried thereby toward the peeling spindles or stemming tubes 6 and 8.

As the carriage 120 at the discharge station travels in toward the peeling spindles, and after the butt ends of the pears have been impaled upon those spindles, the cam tracks 233 carried by the jaws 22 engage the fixed rollers 231 and are thereby moved to open position, the opening movement of the jaws 22 being communicated to the jaws 20 through the gear segments 78 and 98. When the jaws reach fully open position, as illustrated in Figure 4, spring urged latch 108 interengages with the latch bar 106 and holds the jaws 20 and 22 in open position.

The advancing movement of the carriage 120 at the discharge station to transfer the pears from the feeder to the pear preparation machine 2 is completed at 45°, as indicated on timing circle 434, Figure 31, and the transfer cam 228 immediately begins to move the carriage in the opposite direction for the next 50°, as indicated on circle 434.

While the turret is at rest, from zero to 90° on the timing circle 432, the cup return cam 428 actuates the lever 422 which in turn swings the levers 398 and 400 downwardly, or in an outward radial direction relative to the turret 14, through the sleeve 416 and levers 412 and 414 so that the actuating pins 408 and 410 engage the flanges of the cups 16 at the cup-return station and move them to normal outer position. It may be noted at this point that as a carriage and the associated fruit holders move from the discharge station toward the cup-return station, the lugs 56 of the valve actuators 54 engage fixed stops 55 to position the valve ports 52 of the valve 50 in the full line position illustrated in Figure 28 so as to permit this cup-return movement of the centering cups 16. It might also be here noted that as the turret moves to carry a carriage 120 and its associated fruit holders 10 and 12 from the feeding station to the discharge station, valve lugs 58 of the valve actuators 54 engage fixed lugs 55 to return the valve port to the dotted position illustrated in Figure 28 thereby holding the cups 16 in their inner, fruit adjusted positions.

As indicated on timing circle 435, Figure 31, cup-return cam 428 lowers the cup-return mechanism during the same 90° timing period as the dwell period of the turret.

While the turret is at rest, the positioner travel cam 290 is swinging the pear positioner 235 in a direction to return the pear positioner from the position shown in Figure 2 to the position shown in Figure 1, this return movement being completed at 51°40′ of the timing cycle, as illustrated by the timing circle 436, Figure 31.

As the turret 14 is being indexed, during three-quarters of a revolution of the Geneva drive shaft 374, from a timing point of 90° to 360°, the carriage 120 at the discharge station completes its inward return movement at 95° of the timing diagram and remains in that inward or normal position. The next succeeding carriage 120 then begins its outward movement at the timing point of 355° on the timing circle 434.

From the timing point of 51°40′ to the timing point 169°40′ the pear positioner 235 remains at rest in its outward position. The cam 290 then causes the pear positioner 235 to move or swing forward in the same direction as the turret and at the same rate of movement as the turret until the timing point of 252°20′ is reached as illustrated on timing circle 436. The positioner then remains at rest until the timing point of 291°40′, after which it begins its return movement.

As the turret and the pear positioner swing and rotate in unison and while the turret is carrying two pears from the feeding station to the discharge station, the pear positioner rods 237 and 238 are caused to move inwardly, as the brackets 260 and 262 are swung about the axis of the shaft 156. This inward movement of the rods 237 and 238 is caused by the anchor links 292 and 294.

At the timing point of 237°20′, as illustrated on the timing circle 437, Figure 31, the raising portion of the positioner actuator cam 316 begins to lower the positioner rods 237 and 238, through the lever 312, shaft 278, levers 308 and 310, links 304 and 306, levers 300 and 302, levers 296 and 298 and links 292 and 294, so that the shoes 242 and 244 are moved inwardly to position the pears while the turret and the pear positioner are still moving in unison. The cam 316 lowers these pear positioner rods 237 and 238 during 5° of the timing cycle, holds the rods in lowered position, at rest, for the next 5° of the timing cycle and permits raising of the rods, by the action of the springs 317, to clear the pears, during the next 5° of the timing cycle so as to return the rods to anchored position at the same point on the timing cycle as the pear positioner 235 completes its forward swinging movement. Thus as the turret and the pear positioner are moving in unison, the shoes 242 and 244 are brought into engagement with the butt ends of the pears so as to move the pears and the centering cups inwardly relative to the axis of the feed turret different distances determined by the lengths of the individual pears, thereby to position the butt ends of the pears at the same distance from the axis of the turret, regardless of the length of the individual pears.

This inward movement of the centering cups is permitted as the carriage moves from the feeding station to the discharge station because the valve ports were moved to the full line position illustrated in Figure 28 as the carriage was moved to the cup-return station. Moderate resistance to the inward movement of each cup is provided by the port 52 so that the cup moves inwardly only to the extent determined by the length of the pear and the fixed extent of inward movement of the pear positioner beam.

After the pear positioner rods 237 and 238 have been moved inwardly to the full extent of their permissible movement and while the pear positioner 235 is still swinging forwardly in unison with the turret, the valve actuator lugs 58 engage a second set of stop pins 55 thereby returning the valve ports 52 to the closed, dotted line positions of Figure 28. The hydraulic fluid trapped in the cylinder 30 then holds the centering cups in their adjusted positions, as illustrated in Figure 3, which shows pears of different lengths in the fruit holders 10 and 12. It may be noted at this point that the straight flat surfaces of the pear clamping bars 60—62 and 80—82 of the clamping jaws 20 and 22 readily permit the inward adjusting movement of the pears by the pear positioner 235, without marring the surfaces of the pears.

Figure 1 of the drawings shows a pair of fruit holders 10 and 12 at the feeding station with a pear in each centering cup 16, one of the pears being shown as considerably longer than the other. At this time, the clamping jaws 20 and 22 are held open by the interengagement of latch 108 and latch bar 106, as illustrated in Figure 4.

It should be noted that as the carriage 120 begins to move from the feeding station toward the discharge station, the arms 113 of the latch bars 108 engage fixed trip pins 115 thereby releasing the jaws 20 and 22 for closing movement, under the action of the springs 100, just as the turret begins to move.

In Figure 2 of the drawings the turret or spider assembly 14 is shown in the process of moving a carriage 120 and its associated fruit holders 10 and 12 from the feeding station to the discharge station, the pear positioner 235 moving forwardly in unison with the turret and being moved inwardly relative to the axis of the turret to effect the repositioning of the pears in accordance with their individual lengths.

In Figure 3 of the drawings the turret or spider assembly 14 is shown as having completed its movement in which it was engaged as illustrated in Figure 2, with a carriage 120 and its associated fruit holders 10 and 12 at the discharge station and the succeeding carriage 120 and its associated fruit holders 10 and 12 at the feeding station. Figure 3 also illustrates the pear positioner 235 in the course of its return movement from the position of Figure 2 back toward its normal position illustrated in Figure 1.

It is apparent that many widely different embodiments of this invention may be made without departing from the spirit and scope thereof, and therefore it is not intended by this description to limit the invention except as indicated in the appended claims.

Having thus described the invention, what we claim as new and desire to secure by Letters Patent is:

1. In a pear feeder for ungraded pears, a conveyor, a carriage, means shiftably mounting said carriage on said conveyor for movement therewith between a pear receiving station and a pear discharge station and relative thereto at the discharge station, a pear holder, means shiftably mounting said pear holder on said carriage for movement with the conveyor from the pear receiving station to the pear discharge station and for movement with the carriage relative to the conveyor at the discharge station to a pear discharge position and for movement relative to the carriage between said receiving station and said discharge position to position an end of each pear at a predetermined point at the discharge position, and means operatively associated with said conveyor, said carriage and said holder to drive said conveyor, shift said carriage and said holder relative to said conveyor and shift said holder relative to said carriage in proper timed relation to carry a pear in the holder to the discharge station and position a pear regardless of length with an end of the pear at said predetermined point at the discharge position.

2. In a pear feeder for ungraded pears, a feeder turret, said turret having a guide extending generally radially of the axis of said turret, a carriage shiftably mounted on said turret for movement therewith and for movement relative thereto along said guide, a pear holder shiftably mounted on said carriage for movement with the turret from a pear receiving station to a pear discharge station and for movement with the carriage at the discharge station to a pear discharge position and for movement relative to the carriage to position an end of each pear regardless of the length of the pear at a predetermined point at the discharge position, and means operatively associated with said turret, said carriage and said holder to drive said turret, shift said carriage along said guide relative to said turret and said holder relative to said carriage in proper timed relation to carry a pear in the holder from the receiving station to the discharge station and position a pear regardless of length with an end of the pear at a predetermined point at the discharge position.

3. In a feeder for ungraded pears, as set forth in claim 2, wherein the pear holder is shiftably mounted on the carriage for movement relative to the carriage along a path generally parallel to said guide.

4. In a machine for feeding ungraded pears to the stemming tube of a pear preparation machine, a conveyor, a carriage means shiftably mounting said carriage on said conveyor for movement therewith from a fruit receiving station to a fruit discharge station and for movement relative thereto along a path at least a portion of which is parallel to the axis of a stemming tube of the pear preparation machine, a pear holder, means shiftably mounting said holder on said carriage for movement with the conveyor from the pear receiving station to the discharge station and for movement with the carriage at the discharge station to impale a pear on a stemming tube and for movement relative to the carriage to position an end of the pear regardless of the length of the pear at a predetermined point on the stemming tube, and means operatively associated with said conveyor, said carriage and said holder to drive said conveyor, shift said carriage relative to said conveyor along said path and said holder relative to said carriage in proper timed relation to carry a pear from the receiving station to the discharge station and position a pear regardless of length with an end of the pear at said predetermined point on a stemming tube.

5. In a machine for feeding ungraded pears to the stemming tube of a pear preparation machine, a pear holder, a carriage on which the holder is mounted for movement therewith and for movement relative thereto, a conveyor to which the carriage is secured for movement therewith to carry a pear holder from a receiving station to a discharge station and for movement relative thereto to impale a pear in the holder on the stemming tube at the discharge station, means for shifting the holder relative to the carriage distances determined by the lengths of the individual pears in the holder, and means for thereafter shifting the carriage relative to the conveyor through a fixed distance to impale the pear in the holder regardless of length on a stemming tube with an end thereof at a predetermined point on the tube.

6. In a machine for feeding ungraded pears to the stemming tube of a pear preparation machine, as in claim 4, wherein the pear holder includes a pear centering cup and pear centering clamp means for automatically aligning the stem axis of each pear with the axis of the stemming tube at the discharge station.

7. In a pear feeder for ungraded pears, as in claim 4, means for locking the pear holder against movement relative to the carriage and control means for releasing said locking means to permit shifting of said holder relative to said carriage.

8. In a machine for feeding ungraded pears to the stemming tube of a pear preparation machine as in claim 4, hydraulic means interconnecting the carriage and the holder for locking the holder against movement relative to the carriage and control means for releasing said hydraulic locking means to permit shifting of the holder relative to the carriage.

9. In a pear feeder for ungraded pears, a pear holder, a carriage, means for mounting said holder on said carriage for adjustment relative to the carriage, a conveyor, means securing said carriage to said conveyor for movement therewith along a predetermined path of conveyance and for movement relative thereto along a discharge path transverse to said path of conveyance, means engageable with a pear in the holder for adjusting the holder relative to the carriage in accordance with the length of the pear, and means operatively associated with said conveyor and said carriage for shifting the carriage along the discharge path to position a pear in an adjusted holder with an end of the pear at a predetermined point at the end of the discharge path of movement of the carriage.

10. In a feeder for ungraded pears, a support, a fruit feed cup, means shiftably mounting said cup on said support for movement from a fruit receiving position to an adjusted position relative to the support, conveying means connected to said support for moving the cup and support from a fruit receiving station to a discharge station and means for automatically moving the fruit cup relative to the support to an adjusted position determined by the lengths of the pears so that each pear regardless of length is positioned at a predetermined point at the discharge station.

11. In a feeder for ungraded pears, as set forth in claim 10, the combination of means for latching a cup in fruit receiving and adjusted positions relative to the support, means for controlling said latching means to release the cup for adjusting movement relative to the support, and means operatively connected to the cup for resisting movement of the cup from receiving position to adjusted position.

12. In a feeder for ungraded pears, as set forth in claim 10, the combination of hydraulic means for locking the feed cup in fruit receiving and adjusted positions relative to the support, control means for releasing said hydraulic locking means to permit movement of the cup to the fruit receiving and adjusted positions relative to the support by said adjusting means, and means for returning the cup from adjusted position to fruit receiving position relative to the support.

13. In a feeder for ungraded pears, a conveyor, a plurality of fruit carriers secured in spaced relation to said conveyor for successive movement between a fruit receiving station and a fruit discharge station, each of said carriers including a support, a feed cup, and means for shiftably mounting the cup on the support for movement from a fruit receiving position to an adjusted position relative to the support, means operatively associated with the conveyor for moving each cup from the fruit receiving position to an adjusted position relative to its support according to the lengths of the individual pears as the supports are successively carried from the fruit receiving station to the fruit discharge station so that the corresponding ends of all pears will be positioned at the same point at the fruit discharge station.

14. In a feeder for ungraded pears, a conveyor, a plurality of fruit carriers secured in spaced relation to said conveyor for successive movement between a fruit receiving station and a fruit discharge station, each of said carriers including a support, a feed cup, and means for shiftably mounting the cup on the support for movement from a fruit receiving position to an adjusted position relative to the support, means operatively associated with the conveyor for moving each cup from the fruit receiving position to an adjusted position relative to its support according to the lengths of the individual pears as the supports are successively carried from the fruit receiving station to the fruit discharge station so that the same end of each pear will be positioned at the same point at the fruit discharge station, and means operatively associated with the conveyor for successively returning each feed cup from its adjusted position to its fruit receiving position as its support is carried by the conveyor from the discharge station to the fruit receiving station.

15. In a pear feeder, as set forth in claim 13, wherein there is provided hydraulic means carried by each support for locking the associated feed cup in its fruit receiving and adjusted positions relative to its support, a control valve carried by each support for releasing said hydraulic locking means to permit shifting of the fruit cup between adjusted and fruit receiving positions and valve actuating means operatively associated with the conveyor for opening and closing the valve in timed relation with the movement of the conveyor between said stations.

16. In a machine for feeding ungraded pears to a pear preparation machine having a plurality of peeling spindles sequentially presented in pairs for the simultaneous reception of pears to be prepared by the machine, a conveyor, a plurality of fruit carriers secured in spaced relation to said conveyor for successive movement from a fruit receiving zone to a fruit discharge zone at which the pears are impaled on said spindles, each of said fruit carriers comprising a support, a pair of feed cups and means mounting said feed cups on said support for movements separately from fruit receiving positions to adjusted positions, and means for separately moving the feed cups of each pear from fruit receiving positions to individual adjusted positions determined by the lengths of the pear so that the pears, regardless of length, will be impaled on the spindles with their blossom ends at the same distance from the ends of the spindles.

17. In a machine for feeding ungraded pears to the peeling spindle of a pear preparation machine, a conveyor, a fruit carrier secured to the conveyor for movement along a predetermined path from a fruit receiving station to a fruit discharge station, the fruit carrier comprising a carriage mounted for movement relative to the conveyor along a path transverse to said predetermined path to impale a pear on a peeling spindle at the discharge station, a feed cup for receiving a pear stem end foremost with its blossom end exposed and means mounting said feed cup on said carriage for movement relative to the carriage generally parallel to the path of movement of the carriage relative to the conveyor and from an outward fruit receiving position to an inward adjusted position, and means operatively associated with the conveyor for movement therewith and for movement relative thereto transversely of said predetermined path into engagement with the exposed blossom end of the pear for moving the pear and the feed cup inwardly from the fruit receiving position to an adjusted position determined by the length of the pear as the carrier is moving from fruit receiving position to fruit discharging position whereby each pear is impaled on a spindle with the blossom end of the pear, regardless of length, at the same point on the spindle.

18. In a machine for feeding pears, as set forth in claim 17, wherein the conveyor comprises a turret and the carriage is mounted on the turret for movement generally radially of the turret, and the means for moving the feed cup to adjusted position comprises a support mounted for swinging movement about an axis concentric with the axis of the turret and pear engaging and positioning means slidably mounted on said support for movement radially of the turret.

19. In a machine, as set forth in claim 17, wherein the fruit carrier includes hydraulic means mounted upon the carriage for locking the feed cup in fruit receiving and adjusted positions, a control valve mounted upon said carriage and movable between open and closed positions for rendering the hydraulic means effective or ineffective to lock the feed cup against movement relative to the carriage, an actuator carried by said valve, and means operatively associated with the conveying means for engaging and actuating said actuator means during movement of the conveyor.

20. In a machine for feeding ungraded pears to the peeling spindles of a pear preparation machine, an intermittently operated turret, a plurality of fruit carriers secured to said turret for indexing movement between a plurality of stations, including a fruit receiving station and a fruit discharging station proximate a spindle of the pear preparation machine, each fruit carrier comprising a carriage slidably mounted upon the turret for movement in a predetermined path substantially parallel to the axis of a spindle at the fruit discharge station to impale a pear on the spindle, a feed cup shiftably mounted on each carriage for movement from an outward fruit receiving position to an inward adjusted position relative to the carriage, each feed cup receiving a pear stem end foremost and having a conical pear engaging surface for automatically centering the stem end of the pear relative to the carriage, a pair of interconnected fruit centering clamps mounted on each carriage for engaging and centering the blossom end of the pear relative to the carriage and aligning the stem axis of the pear parallel to said predetermined path, pear positioning means operatively associated with the turret for shifting each feed cup inwardly from the fruit receiving position to an adjusted position with its blossom end at a fixed radial distance from the axis of rotation of the turret as each fruit carrier moves from fruit receiving station to fruit discharge station, and means operatively associated with the turret for sliding said carriage along said predetermined path to impale the pear on a spindle with its blossom end at a predetermined point of the spindle.

21. In a machine for feeding ungraded pears to the peeling spindles of a pear preparation machine, as set forth in claim 20, wherein the feed cup is mounted on the carriage by hydraulic position control means comprising a hydraulic cylinder secured to the carriage, a piston in said cylinder and connected to said feed cup, a valve secured to said carriage and in hydraulic communication with said cylinder at opposite sides of said piston for controlling the flow of hydraulic fluid from one side of the piston to the other whereby to lock said feed cup in the fruit receiving and adjusted positions and release said feed cup for movement between said positions, and means operatively associated with the turret for actuating said valve in timed relation with the movement of the turret.

22. In a machine for feeding ungraded pears to the peeling spindles of a pear preparation machine, set forth in claim 20, wherein the fruit centering clamps of each pear are pivotally mounted on the carriage for swinging movement between an open fruit receiving position and a closed fruit engaging position exposing the blossom end of the pear, spring means urging said clamps to closed position, latch means operatively connected to said clamps for retaining the clamps in open position, means operatively associated with the turret for actuating said latch means to release said clamps for movement to closed position on movement of the turret to convey the carrier from the fruit receiving station toward the fruit discharge station, and means operatively associated with each carriage for opening said clamps in timed relation with the movement of the carriage along said predetermined path and when the blossom end of the pear has been impaled on a spindle.

23. In a machine for feeding ungraded pears to the peeling spindles of a pear preparation machine, as set forth in claim 20, wherein the pear positioning means comprises an oscillating support, a member slidably mounted on said support for movement radially of the turret, pear positioning and engaging means mounted upon said member and positioned to engage the blossom end of a pear in a feed cup and move the pear and feed cup to adjusted position on inward radial movement of said member, and means operatively associated with said turret for oscillating said support to and fro in timed relation with the turret and at the same rate as the turret during the engagement of said pear positioning means with the pear.

24. In a machine for feeding ungraded pears to the peeling spindles of a pear preparation machine, an intermittently operated turret having radially extending guides, a carriage slidably mounted on each of said guides, a pair of hydraulic cylinders mounted on each carriage, hydraulic pistons mounted in each of said cylinders and having piston rods extending therefrom parallel to said guides, valves controlling fluid communication between the opposite ends of the pistons in each of said cylinders, said valves being mounted upon said carriages and having individual actuators therefor, a conical fruit receiving cup secured to the outer end of each of said piston rods, a pair of fruit engaging and clamping jaws associated with each of said cups and pivotally mounted upon each of said carriages for movement between a fruit receiving position and a fruit clamping position, said feed cups being adapted to receive the pears stem end foremost and said clamps having linear fruit engaging clamp surfaces extending longitudinally of the fruit in the feed cups to permit free sliding movement of the fruit in the closed clamps, an oscillating support mounted for swinging movement about the axis of the turret, a member slidably mounted upon said support for movement radially of the turret, pear positioning means carried by said slide member for movement radially of the turret into engagement with the exposed blossom ends of the pears in said feed cups to move the pears and the feed cups to adjusted positions relative to the carriage with the blossom ends of all pears at a fixed radial distance from the axis of the turret, means operatively associated with the turret for engaging said valve actuators to move said valves between opened and closed positions in timed relation to the movement of the turret as the turret carries a carriage from a fruit receiving station to a fruit discharge station at which the pair of feed cups carried by the carriage are aligned with a pair of peeling spindles of the pear preparation machine, means operatively associated with the turret for oscillating said support to and fro in timed relation with the turret and at the same rate as the turret during the engagement of said pear positioning means with the pears in the feed cups, means for guiding said carriages along an arcuate path concentric to the axis of the turret during the movement of the carriage from fruit receiving station to fruit discharging station, and means operatively associated with the turret for sliding each carriage when at the discharge station along its associated said turret guide to impale the two pears in adjusted position on the carriage on the impaling spindles with their blossom ends at the same distance from the ends of the spindles.

25. In a pear feeder as set forth in claim 13, wherein there is provided hydraulic means carried by each support locking the associated feed cup in its fruit receiving and adjusted positions relative to its support, a control valve carried by each support for releasing said hydraulic locking means to permit shifting of the fruit cup between adjusted and fruit receiving positions, valve actuating means operatively associated with the conveyor for opening and closing the valve in timed relation with the movement of the conveyor between said stations, and hydraulic flow-restricting ports regulating the movements of the cups from fruit receiving to adjusted positions.

References Cited in the file of this patent
UNITED STATES PATENTS
2,742,067    Coons _____ Apr. 17, 1956